United States Patent
Kishikawa et al.

(10) Patent No.: US 9,234,817 B2
(45) Date of Patent: Jan. 12, 2016

(54) FLOW RATE MEASURING APPARATUS

(71) Applicant: Mitsubishi Electric Corporation, Chiyoda-ku, Tokyo (JP)

(72) Inventors: Naoyuki Kishikawa, Chiyoda-ku (JP); Yuji Ariyoshi, Chiyoda-ku (JP); Masahiro Kawai, Chiyoda-ku (JP); Hiroyuki Uramachi, Chiyoda-ku (JP); Kazuto Akagi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 155 days.

(21) Appl. No.: 14/180,516

(22) Filed: Feb. 14, 2014

(65) Prior Publication Data

US 2015/0101402 A1   Apr. 16, 2015

(30) Foreign Application Priority Data

Oct. 11, 2013 (JP) ................................. 2013-213348

(51) Int. Cl.
*G01M 15/04* (2006.01)
*G01F 9/00* (2006.01)
*G01F 1/684* (2006.01)

(52) U.S. Cl.
CPC ........... *G01M 15/042* (2013.01); *G01F 1/6842* (2013.01); *G01F 9/00* (2013.01)

(58) Field of Classification Search
CPC ............................ G01M 15/04; G01M 15/042
USPC ............................. 73/114.31, 114.32, 114.33
See application file for complete search history.

(56) References Cited

U.S. PATENT DOCUMENTS

| | | |
|---|---|---|
| 6,526,822 B1 | 3/2003 | Maeda et al. |
| 2001/0006005 A1 | 7/2001 | Sato et al. |
| 2003/0094041 A1 | 5/2003 | Iwaki et al. |
| 2005/0150290 A1* | 7/2005 | Kawai ......................... G01F 5/00 73/204.22 |
| 2007/0068246 A1* | 3/2007 | Uramachi ............. G01F 1/6842 73/202.5 |
| 2009/0000366 A1* | 1/2009 | Uramachi ............. G01F 15/185 73/114.32 |
| 2010/0000308 A1* | 1/2010 | Ariyoshi ................... G01F 1/72 73/114.32 |
| 2010/0095761 A1* | 4/2010 | Ariyoshi ................. G01F 1/684 73/202.5 |
| 2010/0242589 A1 | 9/2010 | Morino et al. |
| 2012/0000280 A1* | 1/2012 | Kishikawa ............ G01F 1/6842 73/204.22 |
| 2012/0103107 A1* | 5/2012 | Uramachi ............. G01F 1/6842 73/861.08 |

FOREIGN PATENT DOCUMENTS

| | | |
|---|---|---|
| JP | 2003-315116 A | 11/2003 |
| JP | 3602762 B2 | 12/2004 |
| JP | 3681627 B2 | 8/2005 |
| JP | 3797210 B2 | 7/2006 |
| JP | 4161077 B2 | 10/2008 |
| JP | 4553898 B2 | 9/2010 |
| JP | 4929335 B2 | 5/2012 |

* cited by examiner

*Primary Examiner* — Eric S McCall
(74) *Attorney, Agent, or Firm* — Sughrue Mion, PLLC; Richard C. Turner

(57) ABSTRACT

Dust with various particle diameters entering a bypass passage, particularly, relatively large dust with a particle diameter of 100 to 200 μm or so, is reliably caused to collide with a first step-shaped part, a second step-shaped part and a plate-like member to be sufficiently decelerated and reach a flow rate detecting device with low collision energy. This can prevent the flow rate detecting device from being damaged by collision of dust. Furthermore, the placement position of the plate-like member is optimized to suppress air turbulence at a flow rate detecting part, which achieves a good balance between flow rate detection accuracy and dust tolerance.

20 Claims, 17 Drawing Sheets

PLACEMENT POSITION OF PLATE-LIKE MEMBER

PLACEMENT POSITION OF PLATE-LIKE MEMBER

A−A

B – B

C-C

FLOW RATE MEASURING APPARATUS

BACKGROUND OF THE INVENTION

1. Field of the Invention

The present invention relates to a flow rate measuring apparatus, and particularly relates to a flow rate measuring apparatus for measuring flow rate of intake air of an internal combustion engine.

2. Description of the Related Art

A known flow rate measuring apparatus that is mounted on an intake pipe of an internal combustion engine and measures flow rate of intake air is a flow rate detecting device placed in a bypass passage through which part of intake air is taken in. For the flow rate detecting device, a semiconductor device having a flow rate detecting part formed of a thin film with a thickness of several micrometers is used.

Generally, the intake pipe of the internal combustion engine has an air cleaner placed therein for air purification. However, relatively small dust, for example, with a particle diameter of 100 μm or less cannot be removed by a purifying filter in the air cleaner and gets mixed into intake air. Furthermore, deterioration of the purifying filter, use of the purifying filter in a region with a severe usage condition, use of a substandard filter other than a proper product, or the like may cause relatively large dust with a particle diameter of 100 to 200 μm or so to get mixed into intake air.

When such dust is accelerated by intake air and collides with the flow rate detecting device at high speed, the flow rate detecting part may be damaged depending on the particle diameter or speed of the dust. In view of the above, Patent Documents 1 to 7 present structures as follows of the flow rate measuring apparatus including a semiconductor-type flow rate detecting device in order to prevent the flow rate detecting part from being damaged by incoming dust mixed with intake air.

According to the Patent Documents 1 and 2, a bypass passage through which part of flow rate of intake air is taken in is bent several times, then the flow rate detecting device is placed in the bypass passage downstream of the bends. This structure prevents dust accelerated by the mainstream from directly colliding with the flow rate detecting device. On the other hand, dust entering the bypass passage is decelerated by colliding with the wall surface of the bypass passage several times, which reduces energy of collision with the flow rate detecting device.

According to the Patent Document 3, the wall surface of the bypass passage is formed into roughened surface including continuous bumps and dips with a pitch of 50 μm to 1 mm. This reduces rebound when dust entering the bypass passage collides with the wall surface to decelerate the dust, thereby reducing energy of collision with the flow rate detecting device.

According to the Patent Document 4, bumps and dips in sawtooth pattern are molded on the wall surface of the bypass passage in the range on which the inlet opening plane of the bypass passage is projected. Due to this, dust accelerated by intake air collides straight with the sawtooth wall surface several times to be decelerated, which reduces energy of collision with the flow rate detecting device.

According to the Patent Document 5, a partition plate for branching a stream is formed in the bypass passage curved in a U-shape. This causes fluid to be measured that is introduced in the bypass passage to largely turn around before reaching an inlet of a sub-bypass passage in which the flow rate detecting device is placed, which prevents largely inertial dust from entering the sub-bypass passage.

According to the Patent Document 6, a guide louver for stopping dust rebounding from the wall surface of the bypass passage is placed upstream of the flow rate detecting device to prevent dust from colliding with the flow rate detecting device placed inside the guide louver. This reduces damage of the flow rate detecting device and adherence of contaminant to the flow rate detecting device.

According to the Patent Document 7, a plate-like member having a plate surface parallel to the flow passage direction of the bypass passage is provided directly upstream of the flow rate detecting device. This plate-like member smoothes the fluid to be measured, and also causes dust included in the fluid to be measured to move with the smooth flow, so the dust will no longer have a large momentum in the direction perpendicular to the detection surface of the flow rate detecting device. This reduces damage of the flow rate detecting device and adherence of contaminant to the flow rate detecting device.

Patent Document 1: Japanese Patent No. 4,161,077
Patent Document 2: Japanese Patent No. 3,602,762
Patent Document 3: Japanese Patent No. 4,553,898
Patent Document 4: Japanese Patent No. 4,929,335
Patent Document 5: Japanese Patent No. 3,681,627
Patent Document 6: Japanese Patent No. 3,797,210
Patent Document 7: JP-A-2003-315116

As described above, for the conventional flow rate measuring apparatus, various structures have been proposed in order to prevent the flow rate detecting device from being damaged by dust mixed into air as fluid to be measured. On the other hand, since the trajectory of flying dust varies depending on the particle diameter of the dust, a structure having high tolerance for dust having various particle diameters is needed. Also, a structure that increases dust tolerance while not decreasing the flow rate detection accuracy is needed.

However, in the flow rate measuring apparatus of the Patent Documents 1 and 2, increasing the number of bends in the bypass passage increases pressure loss occurring in the bypass passage, thereby causing drift. This causes turbulence in air moving toward the flow rate detecting device, thereby decreasing the flow rate detection accuracy. Thus, only bending the bypass passage has difficulty in sufficiently reducing collision energy of dust while maintaining the flow rate detection accuracy.

Furthermore, the flow rate measuring apparatus of the Patent Document 3 has a problem that collision energy of relatively large dust with a particle diameter of 100 to 200 μm or so cannot be sufficiently reduced. Also, providing fine bumps and dips on the wall surface of the bypass passage makes it easier for dust of several micrometers to adhere to the wall surface, which causes a problem of increase in characteristic variation due to contamination and a problem of not obtaining an intended effect due to bumps and dips covered with contaminant.

Furthermore, the flow rate measuring apparatus of the Patent Document 4 also has a problem that collision energy of dust with a particle diameter of 100 to 200 μm or so cannot be sufficiently reduced, similarly to that of the Patent Document 3. Also, the sawtooth bumps and dips having an angle less than 90 degrees are likely to cause stagnation of air, which causes a problem of increase in pressure loss and a problem of decrease in the flow rate detection accuracy due to air turbulence. Another problem is that small dust is likely to be deposited on the bumps and dips, and, when the bumps and dips are covered with the dust, an intended effect cannot be obtained.

Furthermore, the flow rate measuring apparatus of the Patent Document 5 includes the flow rate detecting device placed in the deepest part of the U-shaped sub-bypass passage, which has a problem that, when air containing dust is introduced into the sub-bypass passage, the airborne dust flies along the sub-bypass passage and generally perpendicularly collides with the flow rate detecting device.

Furthermore, in the flow rate measuring apparatus of the Patent Document 6, dust entering inside of the guide louver collides with the guide louver and then moves toward the flow rate detecting device, so collision with the flow rate detecting device cannot be avoided. Another problem is that the guide louver mounted near the flow rate detecting device causes air turbulence, thereby significantly reducing the flow rate detection accuracy.

Furthermore, in the flow rate measuring apparatus of the Patent Document 7, the plate-like member is provided directly upstream of the flow rate detecting device, which provides an effect of smoothing the flow velocity vector against drift, but has a problem of increase in pressure loss and significant decrease in the speed of air flow in the bypass passage and a problem of large air turbulence directly downstream of the plate-like member causing decrease in the flow rate detection accuracy.

SUMMARY OF THE INVENTION

In order to solve the above problems, it is an object of the present invention to provide a highly reliable flow rate measuring apparatus that achieves a good balance between dust tolerance and flow rate detection accuracy by sufficiently decreasing collision energy of relatively large dust with a particle diameter of 100 to 200 µm or so among other dust contained in fluid to be measured to prevent a flow rate detecting device from being damaged by high speed collision of the dust with the flow rate detecting device.

The flow rate measuring apparatus in accordance with the invention is a flow rate measuring apparatus that is inserted into a through hole formed in a pipe from the outside of the pipe and is placed in the pipe such that the insertion direction into the through hole is generally perpendicular to the mainstream direction of fluid to be measured passing through the pipe, the apparatus including: a bypass passage, having a rectangular passage cross section, for causing part of fluid to be measured to pass therethrough; and a flat plate-shaped flow rate detecting device provided in the bypass passage. The bypass passage includes: an inlet that is open in the direction toward the upstream side of the mainstream direction and takes in part of fluid to be measured; a first passage part that extends from the inlet to a first bending part along the mainstream direction; a second passage part that extends from the first bending part toward the anti-insertion direction to a second bending part along the direction perpendicular to the mainstream direction; and a third passage part that extends from the second bending part to a third bending part along the mainstream direction, the flow rate detecting device being placed such that one wall surface of the third passage part is flush with one principal surface of the flow rate detecting device. A first step-shaped part having a plurality of step shapes each consisting of two faces including a face generally perpendicular to the mainstream direction is placed on the inner wall surface on the outer circumference side of the first bending part. A second step-shaped part having a plurality of step shapes each consisting of two faces including a face generally perpendicular to the anti-insertion direction is placed on the inner wall surface on the outer circumference side of the second bending part. A plate-like member that divides the passage cross section of the bypass passage into the insertion direction side and the anti-insertion direction side is placed from the inlet to the downstream-side end of the second passage part along the shape of the bypass passage.

According to the flow rate measuring apparatus in accordance with the invention, dust with various particle diameters entering the bypass passage, particularly, relatively large dust with a particle diameter of 100 to 200 µm or so, is reliably caused to collide with the first step-shaped part, the second step-shaped part and the plate-like member to be sufficiently decelerated and reach the flow rate detecting device with low collision energy, which can prevent the flow rate detecting device from being damaged by collision of dust at high speed. Furthermore, the placement position of the plate-like member is optimized to suppress turbulence of air moving toward the flow rate detecting device, which can provide a reliable flow rate measuring apparatus that achieves a good balance between flow rate detection accuracy and dust tolerance.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
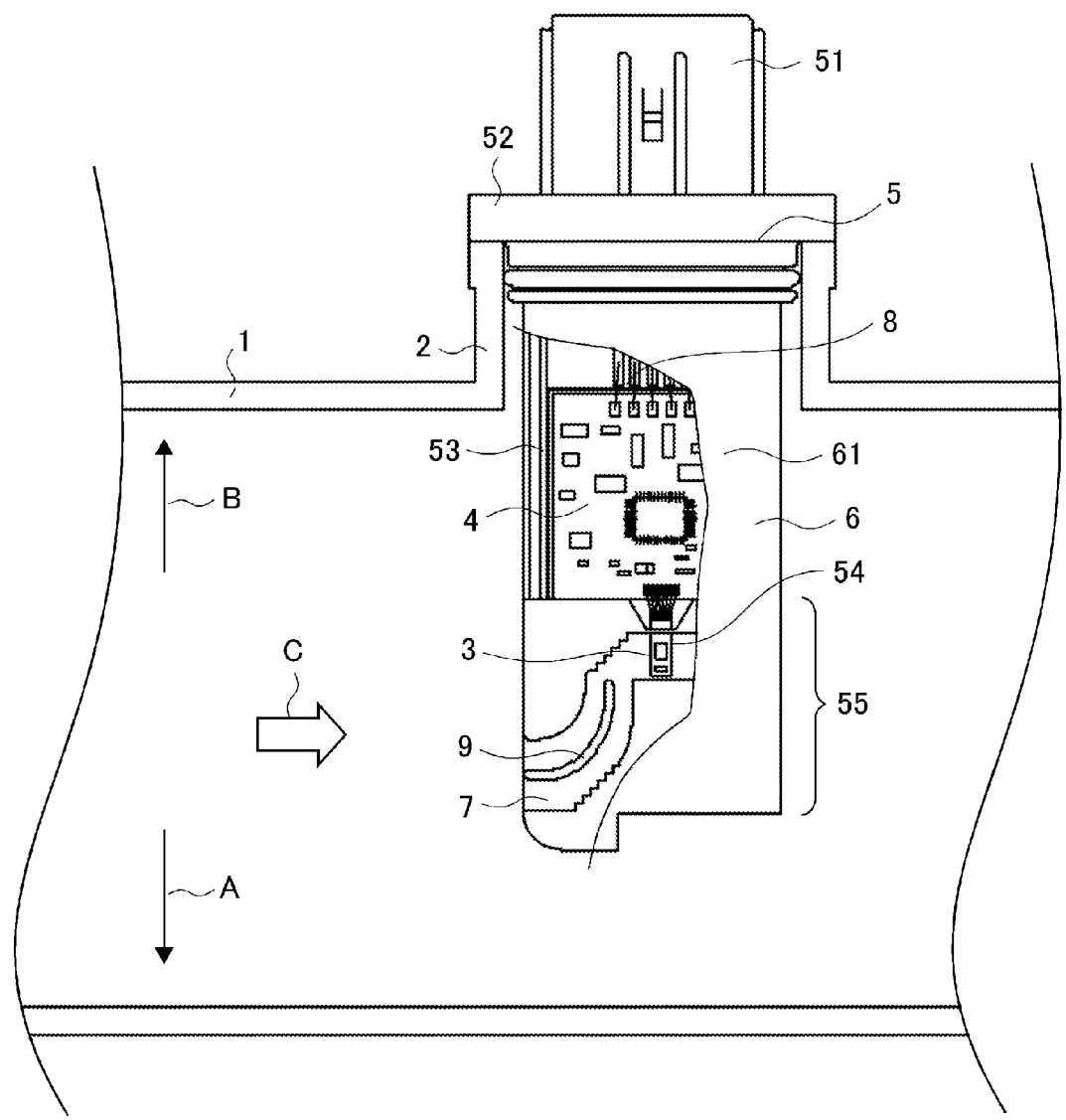
FIG. 1 is a partially cutaway front view of a flow rate measuring apparatus in accordance with a first embodiment of the invention.
Figure 2A:
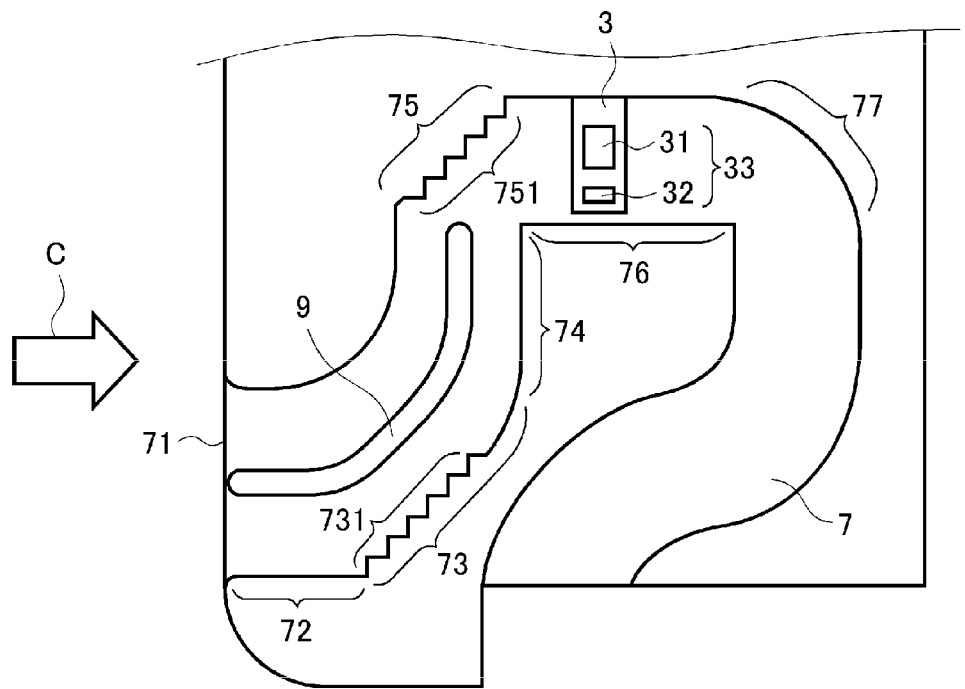
FIG. 2A is a front view and FIG. 2B is a side view of the flow rate measuring apparatus in accordance with the first embodiment of the invention in which a bypass passage and its surroundings are enlarged.
Figure 2B:
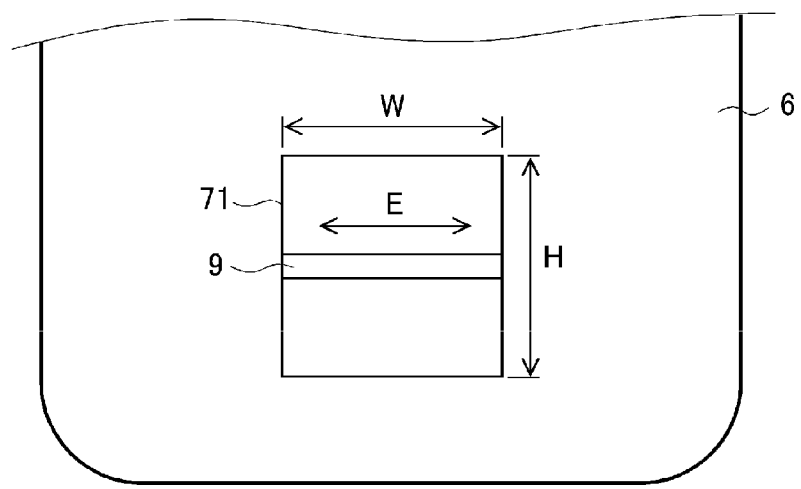

A flow rate measuring apparatus in accordance with a first embodiment of the invention is described below with reference to the drawings. FIG. 1 is a partially cutaway front view of the flow rate measuring apparatus in accordance with the first embodiment. FIG. 2A is a front view and FIG. 2B is a side view of the flow rate measuring apparatus in accordance with the first embodiment in which a bypass passage and its surroundings are enlarged. Note that, through all the drawings referred to in the following description, the same or corresponding components are denoted by the same reference numerals.

The flow rate measuring apparatus in accordance with the first embodiment measures flow rate of fluid to be measured passing through a pipe. For example, as shown in FIG. 1, when intake air passing through an intake pipe 1 of an internal combustion engine is fluid to be measured, an insertion hole 2 that is a through hole into which the flow rate measuring apparatus is to be inserted is provided in the intake pipe 1.

Note that, in FIG. 1, an arrow A indicates the direction along which the flow rate measuring apparatus is inserted (hereinafter referred to as an insertion direction A); an arrow B indicates the direction opposite to the insertion direction A (hereinafter referred to as an anti-insertion direction B); and an arrow C indicates the direction of the mainstream of intake air passing through the intake pipe 1 (hereinafter referred to as a mainstream direction C).

The flow rate measuring apparatus is inserted from the outside of the intake pipe 1 into the insertion hole 2 formed in the intake pipe 1 and installed in the intake pipe 1 such that the insertion direction A into the insertion hole 2 is generally perpendicular to the mainstream direction C. A flow rate detecting device 3 is driven by a circuit board 4 provided on the anti-insertion direction B side of the flow rate detecting device 3. A base 5 holds the circuit board 4 and also supports the flow rate detecting device 3.

A cover 6 is provided stacked on the base 5 and forms a bypass passage 7 for taking in part of intake air in cooperation with the base 5. As shown in FIG. 2B, the bypass passage 7 has a rectangular passage cross section, and the flat plate-shaped flow rate detecting device 3 is placed in the bypass passage 7. An inlet 71 of the bypass passage 7 is provided near a tip of the cover 6 on the insertion direction A side.

The base 5 is formed of a connector 51, a flange 52, a casing part 53, a slot 54 and a bypass passage component 55 in this order from the insertion hole 2 side of the intake pipe 1 to the insertion direction A, which are integrated into one piece by molding. The waterproof connector 51 is placed outside the intake pipe 1. A connector terminal 8 has one end that is a terminal used by the connector 51 side to send/receive signal to/from the outside and the other end is electrically connected to the circuit board 4 by wire bonding or the like.

The flange 52 is fixed to the intake pipe 1 with a screw (not shown) or the like. The casing part 53 supports and contains the circuit board 4. The slot 54 contains the flow rate detecting device 3. The flow rate detecting device 3 is placed in the bypass passage component 55. The detection surface of the flow rate detecting device 3 forms part of the wall surface of the bypass passage 7. This will be described later in detail.

The cover 6 is molded with, for example, PBT resin. The anti-insertion direction B side of the cover 6 forms a circuit board protector 61 that covers the circuit board 4 contained in the base 5. On the other hand, the insertion direction A side of the cover 6 forms the bypass passage 7 for taking in part of air flowing in the intake pipe 1 in cooperation with the base 5.

The semiconductor-type flow rate detecting device 3 is made by etching the rear side of an insulating plate formed of silicon, polysilicon, ceramic or the like to form a thin part and forming on the thin part a flow rate detecting part 33 including a flow rate detecting resistor 31 and a temperature compensating resistor 32. The flow rate detecting device 3 consumes less power and responds quickly due to small heat capacity of a heating resistor and good heat insulation against a supporting member.

However, the flow rate detecting part 33 formed in the thin part is weak in impact from the outside. Especially, when dust accelerated by fluid to be measured collides with the flow rate detecting part 33 at high speed, the flow rate detecting resistor 31 and the temperature compensating resistor 32 may be damaged. Then, as a result, the flow rate detection accuracy may decrease, and furthermore, the measuring capability may be lost.

In order to solve this problem, the flow rate measuring apparatus in accordance with the first embodiment includes a first step-shaped part 731, a second step-shaped part 751 and a plate-like member 9 provided in the bypass passage 7 in which the flow rate detecting device 3 is placed. The structure and operation of them are described below in detail with reference to FIGS. 2 to 13.

Note that the flat plate-shaped flow rate detecting device 3 is placed such that its one principal surface is flush with one wall surface of the bypass passage 7 having the rectangular passage cross section. In the first embodiment, an arrow E shown in FIG. 2B indicates the thickness direction of the flow rate detecting device 3.

In the following description, in the rectangular passage cross section of the bypass passage 7 shown in FIG. 2B, the distance between two sides parallel to the thickness direction E of the flow rate detecting device 3 (denoted by H in FIG. 2B) is referred to as bypass passage height. Also, the distance between two sides perpendicular to the thickness direction E of the flow rate detecting device 3 (denoted by W in FIG. 2B) is referred to as bypass passage width.

The inlet 71 of the bypass passage 7 is open in the direction toward the upstream side of the mainstream direction C and takes in part of intake air passing through the intake pipe 1. As shown in FIG. 2A the bypass passage 7 includes a first passage part 72, a first bending part 73, a second passage part 74, a second bending part 75, a third passage part 76 and a third bending part 77.

The first passage part 72 extends from the inlet 71 to the first bending part 73 along the mainstream direction C. The first bending part 73 is configured to change the flow direction from that in the first passage part 72 (mainstream direction C) by generally 90 degrees in the second passage part 74. The second passage part 74 extends from the first bending part 73 to the second bending part 75 along the direction perpendicular to the mainstream direction C and toward the anti-insertion direction B.

The second bending part 75 is configured to change the flow direction from that in the second passage part 74 by generally 90 degrees in the third passage part 76. Furthermore, the third passage part 76 extends from the second bending part 75 to the third bending part 77 along the mainstream direction C. The flat plate-shaped flow rate detecting device 3 is placed such that its one principal surface is flush with one wall surface of the third passage part 76.

Also, the plate-like member 9 that divides the passage cross section of the bypass passage 7 into the insertion direction A side and the anti-insertion direction B side is provided from the inlet 71 to the downstream-side end of the second passage part 74 along the shape of the bypass passage 7.

Figure 3A:
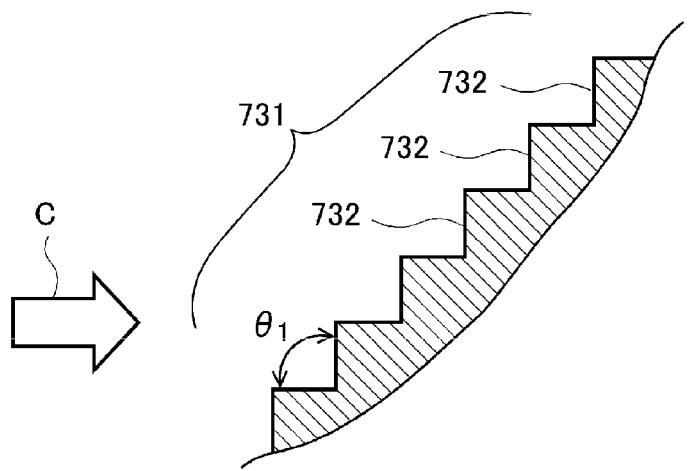
FIG. 3A illustrates a first step-shaped part and FIG. 3B illustrates a second step-shaped part of the flow rate measuring apparatus in accordance with the first embodiment of the invention.

Furthermore, the first step-shaped part 731 is provided on the inner wall surface on the outer circumference side of the first bending part 73. As shown in FIG. 3A, the first step-shaped part 731 has a plurality of step shapes each consisting of two faces including a face 732 generally perpendicular to the mainstream direction C. In the first step-shaped part 731, the two faces forming each step shape are placed at an angle $\theta_1$ of generally 90 degrees to each other.

Figure 3B:
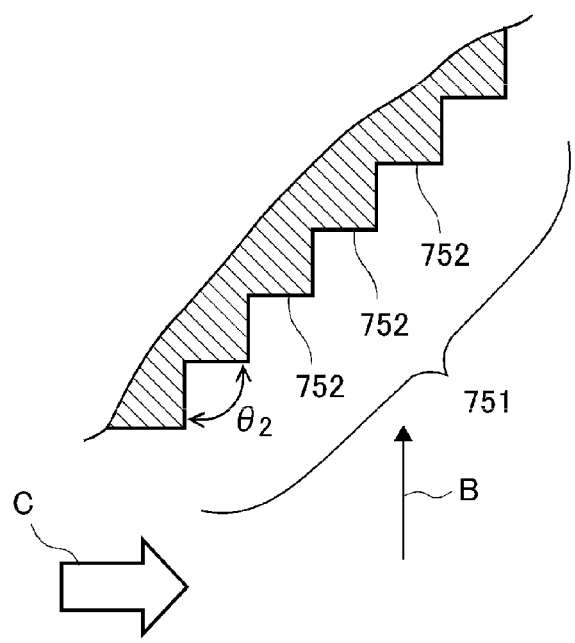

Furthermore, the second step-shaped part 751 is provided on the inner wall surface on the outer circumference side of the second bending part 75. As shown in FIG. 3B, the second step-shaped part 751 has a plurality of step shapes each consisting of two faces including a face 752 generally perpendicular to the anti-insertion direction B. In the second step-shaped part 751, the two faces forming each step shape are placed at an angle $\theta_2$ of generally 90 degrees to each other.

The plate-like member 9, the first step-shaped part 731 and the second step-shaped part 751 are formed as part of the inner wall surface of the bypass passage 7, i.e., part of the base 5 or cover 6, using the same resin material, e.g., PBT resin, and are integrally-molded with the bypass passage 7.

Next, the operation of the plate-like member 9, the first step-shaped part 731 and the second step-shaped part 751 is described. First, as an comparison example, the behavior of dust entering the bypass passage 7 of a conventional flow rate measuring apparatus is described with reference to FIGS. 4 to 6.

Figure 4:
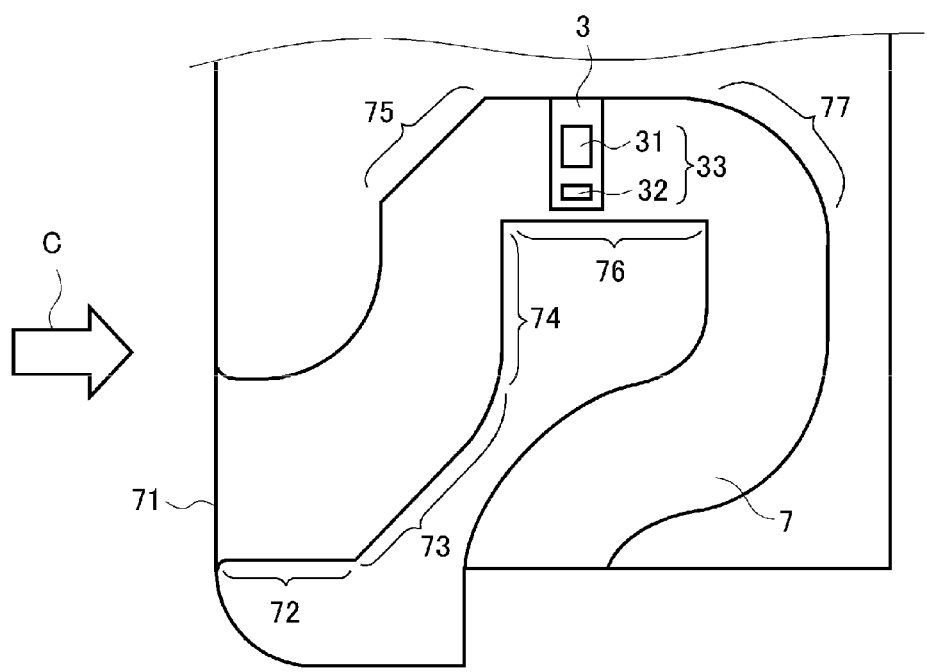
FIG. 4 is a front view of a conventional flow rate measuring apparatus in which a bypass passage and its surroundings are enlarged.

FIG. 4 is a front view of the conventional flow rate measuring apparatus in which the bypass passage 7 and its surroundings are enlarged. The difference from the bypass passage 7 in accordance with the first embodiment (see FIG. 2) is only that the plate-like member 9, the first step-shaped part 731 and the second step-shaped part 751 are not provided. In the conventional bypass passage 7, the inner wall surface on the outer circumference side of the first bending part 73 and the second bending part 75 is formed to be an inclined flat part or an arc-like part with a predetermined radius of curvature.

Also in the conventional structure shown in FIG. 4, the first bending part 73 and the second bending part 75 change the direction of air flow in the bypass passage 7 by generally 90 degrees to prevent dust entering the bypass passage 7 from directly colliding with the flow rate detecting device 3. However, dust entering the bypass passage 7 may move to the inside and collide with the flow rate detecting device 3.

In order to observe the trajectory of dust entering the conventionally structured bypass passage 7, CAE analysis was performed, the result of which is shown in FIGS. 5 and 6. Note that, in the drawings referred to hereinafter, D denotes dust, and L denotes the trajectory of dust.

According to the result of a market research, it was known that the particle diameter of dust contained in air flowing in the intake pipe 1 is normally less than or equal to 100 μm, but large dust with a particle diameter of 200 μm or so may enter the intake pipe 1 in a region with a severe usage condition or depending on how a user uses the apparatus.

So, dust with a particle diameter of 100 μm and 200 μm that may damage the flow rate detecting part 33 when colliding with the flow rate detecting part 33 at high speed was specified as a target of CAE analysis, then the trajectory of dust when a predetermined time elapses in stationary state at a constant mainstream speed was analyzed.

Figure 5A:
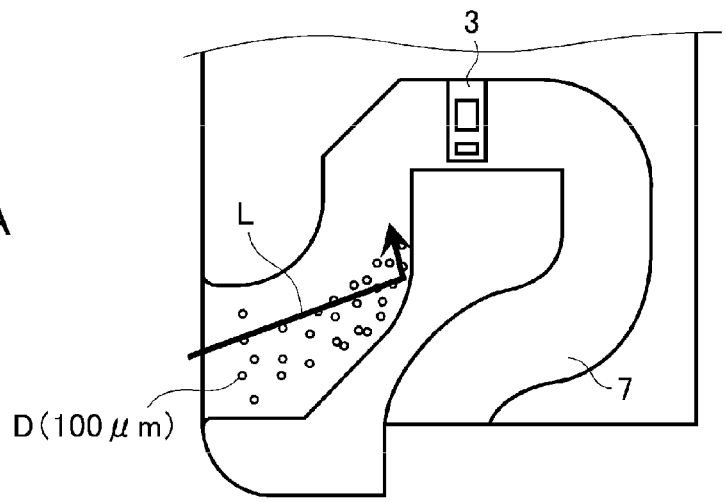
FIG. 5A, FIG. 5B, and FIG. 5C show a trajectory of dust (100 µm) entering the bypass passage of the conventional flow rate measuring apparatus.
Figure 5B:
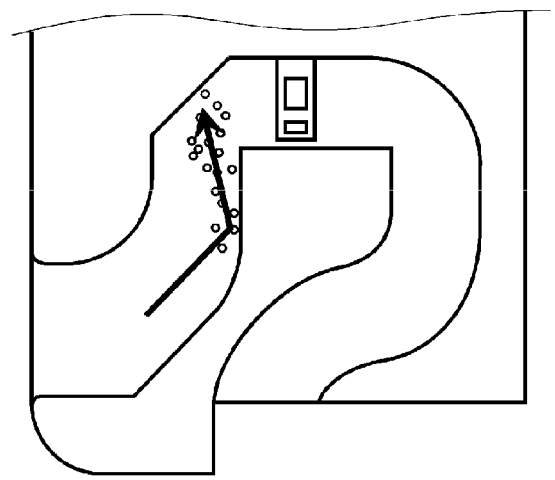
Figure 5C:
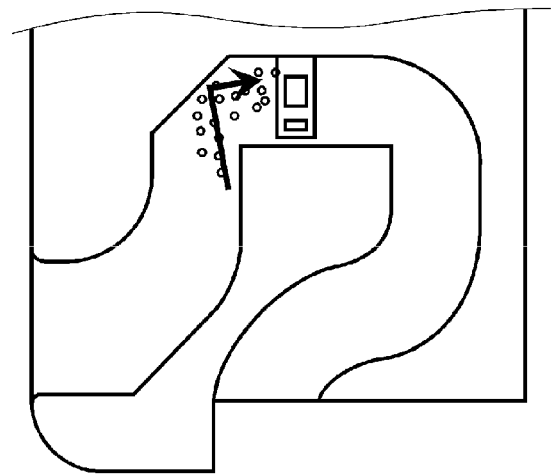

FIGS. 5A to 5C show the trajectory of dust with a particle diameter of 100 μm when a predetermined time has elapsed since the dust was caused to fly. It was observed that dust with a particle diameter of 100 μm tends to be carried by air flow in the bypass passage 7 to fly, and the dust entering the bypass passage 7 collides with the inner wall surface on the outer circumference side of the first bending part 73 at an angle, then collides with the inner wall surface on the outer circumference side of the second bending part 75, and then flies toward the flow rate detecting device 3.

Figure 6A:
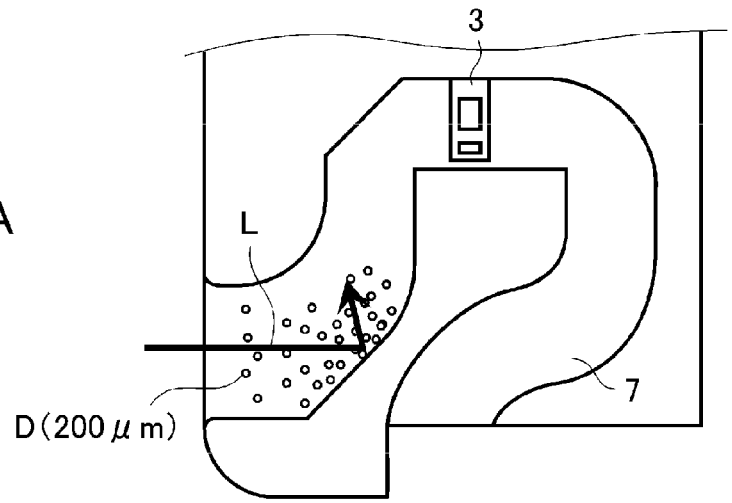
FIG. 6A, FIG. 6B, and FIG. 6C show a trajectory of dust (200 µm) entering the bypass passage of the conventional flow rate measuring apparatus.
Figure 6B:
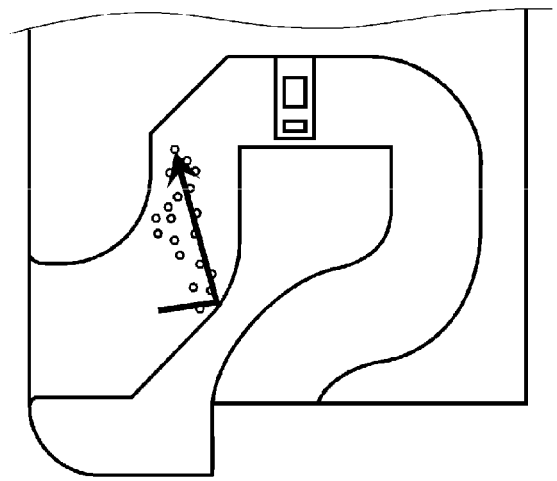
Figure 6C:
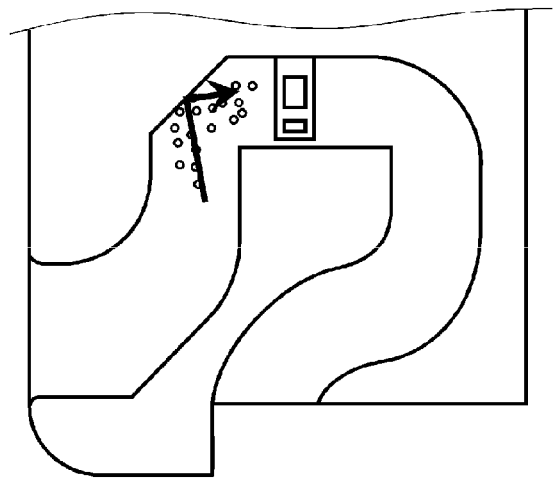

On the other hand, FIGS. 6A to 6C show the trajectory of dust with a particle diameter of 200 μm when a predetermined time has elapsed since the dust was caused to fly. It was observed that, after entering the bypass passage 7, dust with a particle diameter of 200 μm is hardly carried by air flow, but is accelerated by mainstream and moves forward with inertia force while colliding with the wall surface.

According to the result of the analysis described above, it was proved that, since the flow rate detecting device 3 is placed in the bent bypass passage 7, dust accelerated by mainstream does not directly collide with the flow rate detecting device 3, but dust with a relatively large particle diameter is accelerated by mainstream and reaches the flow rate detecting device 3 with very little deceleration.

Next, an effect of placing the plate-like member 9 in the conventionally structured bypass passage 7 shown in FIG. 4 is described with reference to FIGS. 7 and 8. The plate-like member 9 is placed from the inlet 71 to the downstream-side end of the second passage part 74 of the bypass passage 7 along the shape of the bypass passage 7. The inside of the bypass passage 7 is divided by the plate-like member 9 into an anti-insertion direction-side sub-bypass passage 701 and an insertion direction-side sub-bypass passage 702.

Figure 7:
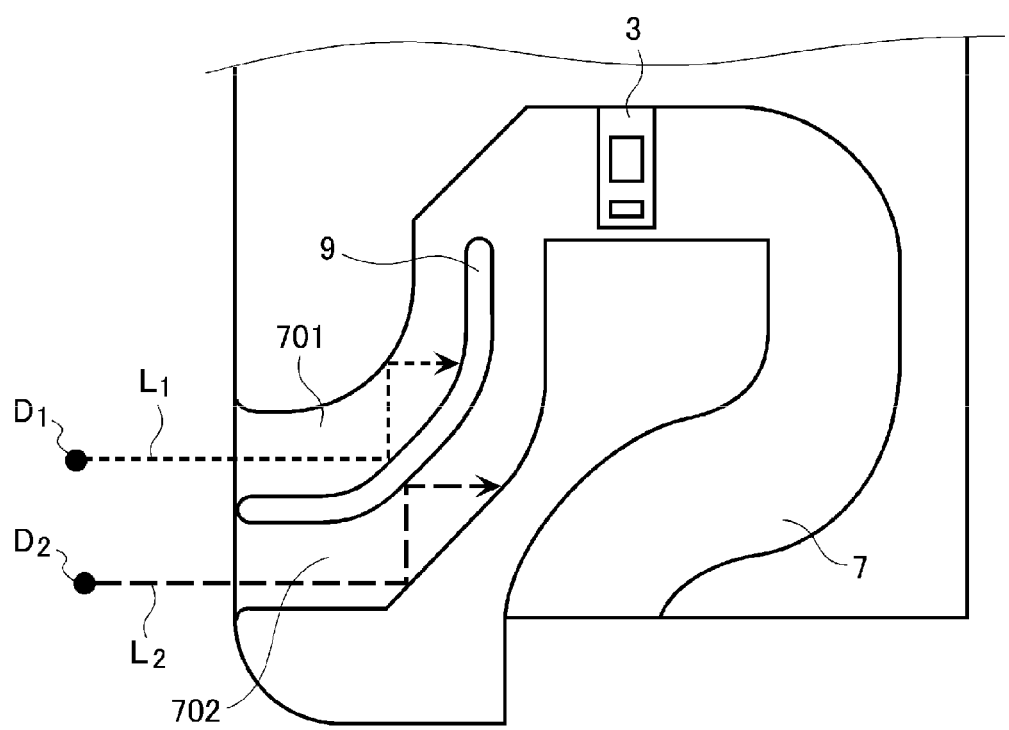
FIG. 7 illustrates an effect of providing only the plate-like member in the bypass passage of the conventional flow rate measuring apparatus.

FIG. 7 shows a trajectory L1 of a dust D1 entering the anti-insertion direction-side sub-bypass passage 701 and a trajectory L2 of a dust D2 entering the insertion direction-side sub-bypass passage 702. Since the dusts D1 and D2 entering the bypass passage 7 are accelerated by mainstream, when they collide with the wall surface of the bypass passage 7, they rebound from the wall surface and collide with the plate-like member 9. So, in comparison with the case without the plate-like member 9, the number of collision of the dusts with the wall surface of the bypass passage 7 significantly increases, thereby decelerating the dusts.

Figure 8A:
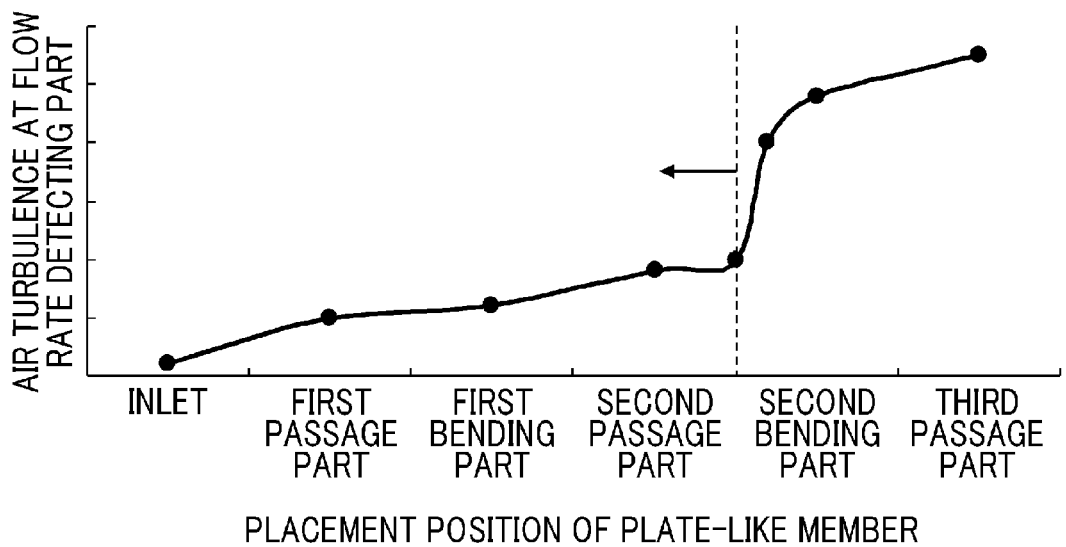
FIG. 8A shows the relation between the air turbulence at a flow rate detecting part and the placement position of the plate-like member.

FIG. 8A shows the relation between the placement position of the plate-like member 9 and the air turbulence at the flow rate detecting part 33. Here, how to evaluate the air turbulence at the flow rate detecting part 33 is briefly described. An evaluation apparatus capable of causing air to flow in the flow rate measuring apparatus at a predetermined flow rate is used to measure the output level (voltage) when incrementally increasing the flow rate, thereby obtaining the relation between the flow rate and the voltage. Then, the standard deviation (%) of the output disturbance occurring in the output level due to air turbulence is defined as "air turbulence at the flow rate detecting part."

A number of covers 6 are prepared for the above-described evaluation apparatus, which are gradually elongated from the inlet 71 to the third passage part 76 of the bypass passage 7. Then, the relation between the placement position of the plate-like member 9 and the air turbulence at the flow rate detecting part 33 is obtained.

As seen from FIG. 8A, when the plate-like member 9 is placed beyond the second bending part 75 on the flow rate detecting device 3 side, the flow rate detecting part 33 is exposed to separated shear layer including vortex and circulating flow occurring downstream of the plate-like member 9, which significantly increases air turbulence near the flow rate detecting part 33.

Accordingly, placing the plate-like member 9 extended to just before the second bending part 75, i.e., to the downstream-side end of the second passage part 74, can prevent the flow rate detecting part 33 from being exposed to separated shear layer caused by the plate-like member 9 to significantly increase air turbulence, thereby reducing the impact of air turbulence on the flow rate detecting part 33.

Figure 8B:
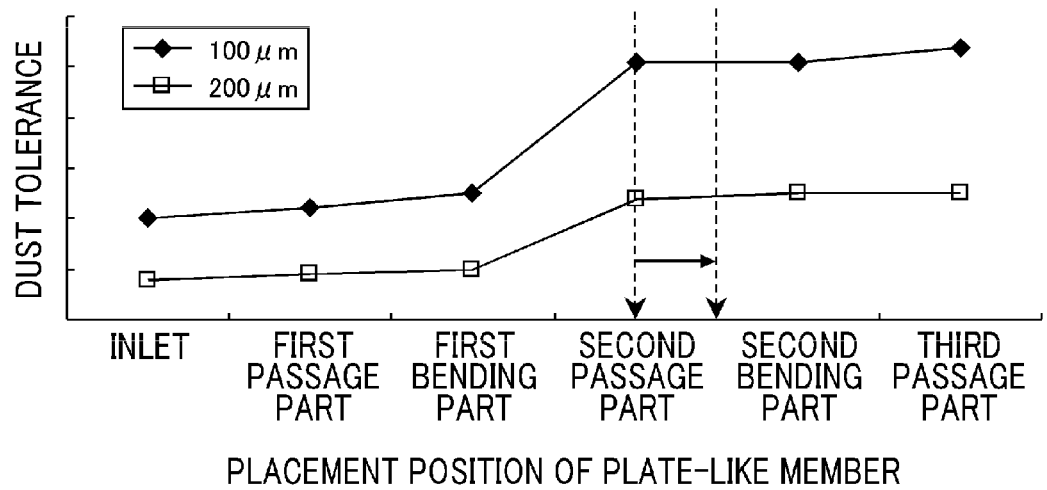
FIG. 8B shows the relation between the dust tolerance of the flow rate detecting part and the placement position of the plate-like member.

Furthermore, FIG. 8B shows the relation between the placement position of the plate-like member 9 and the dust tolerance of the flow rate detecting part 33 for each dust particle diameter (100 μm, 200 μm). Here, how to evaluate the dust tolerance of the flow rate detecting part 33 is briefly described. An evaluation apparatus capable of causing air to flow in the flow rate measuring apparatus at a predetermined flow rate is used, and dust with a particle diameter of 100 μm or 200 μm is introduced through the inlet 71 of the bypass passage 7.

Then, the flow rate is gradually increased while the output of the flow rate measuring apparatus is being monitored, and, when an abnormal output occurs, it is determined that the flow rate detecting part 33 has been damaged by dust. This dust-damaging flow rate (g/s) is defined as dust tolerance. Accordingly, when dust is less likely to collide with the flow rate detecting part 33 or when the speed of dust is sufficiently reduced even if collides with the flow rate detecting part 33, the dust tolerance is high.

As seen from FIG. 8B, placing the plate-like member 9 extended to downstream of the second passage part 74 significantly increases the dust tolerance. According to these results of analysis and experiments, in order to minimize air turbulence and surely maximize the dust tolerance, the downstream-side end of the plate-like member 9 needs to be placed at the boundary between the second passage part 74 and the second bending part 75, which enables a good balance between suppressing air turbulence and increasing dust tolerance.

However, as shown in FIG. 8B, for dust with a particle diameter of 200 μm, only the placement of the plate-like member 9 is insufficient for ensuring adequate dust tolerance. This is because, when entering the bypass passage 7, relatively large dust with a particle diameter of 200 μm has initial collision energy larger than that of dust with a particle diameter of 100 μm or less, and cannot be sufficiently decelerated only with placement of the plate-like member 9.

For this reason, in addition to the plate-like member 9, the flow rate measuring apparatus in accordance with the first embodiment includes the first step-shaped part 731 having a plurality of step shapes each consisting of two faces including the face 732 generally perpendicular to the mainstream direction C, placed on the inner wall surface on the outer circumference side of the first bending part 73. An effect of the first step-shaped part 731 is described with reference to FIG. 9.

Generally, the members forming the bypass passage 7 are made of a glass filler-contained thermoplastic resin having a relatively high coefficient of rebound, so dust entering the bypass passage 7 is hardly likely to be decelerated by collision with the wall surface of the bypass passage 7.

Figure 9:
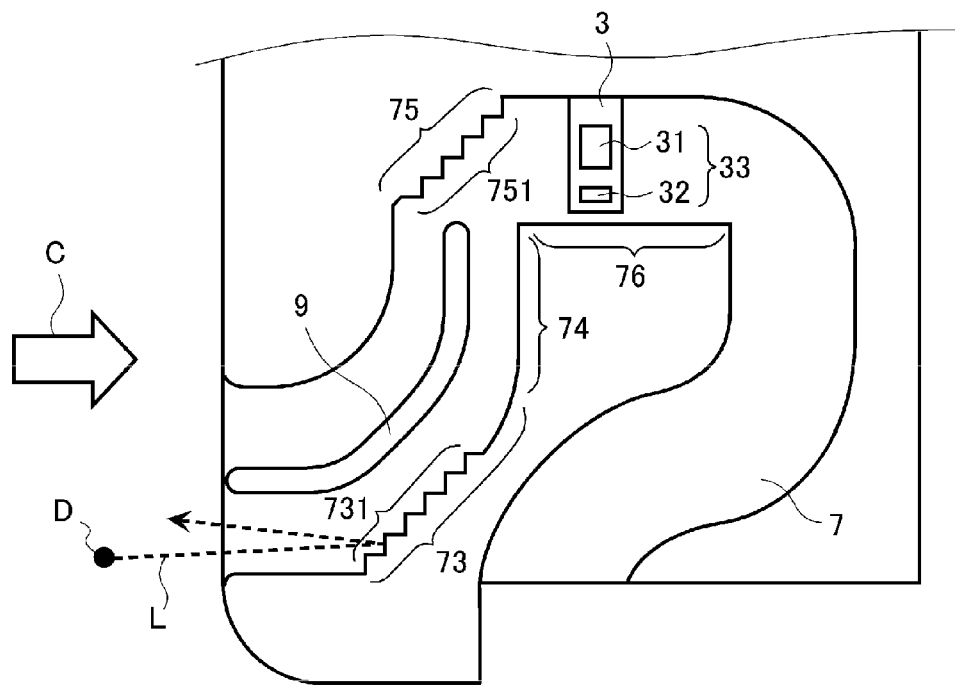
FIG. 9 illustrates an effect of the first step-shaped part of the flow rate measuring apparatus in accordance with the first embodiment of the invention.

However, the first step-shaped part 731 takes advantage of the high coefficient of rebound of the wall surface of the bypass passage 7. As shown in FIG. 9, dust entering the bypass passage 7 generally perpendicularly collides with the face 732, which is generally perpendicular to the mainstream direction C, of the first step-shaped part 731. This substantially decelerates the dust. Also, the dust having rebounded may be ejected through the inlet 71 of the bypass passage 7 to the outside of the bypass passage 7, which can decrease dust entering the bypass passage 7.

Figure 10:
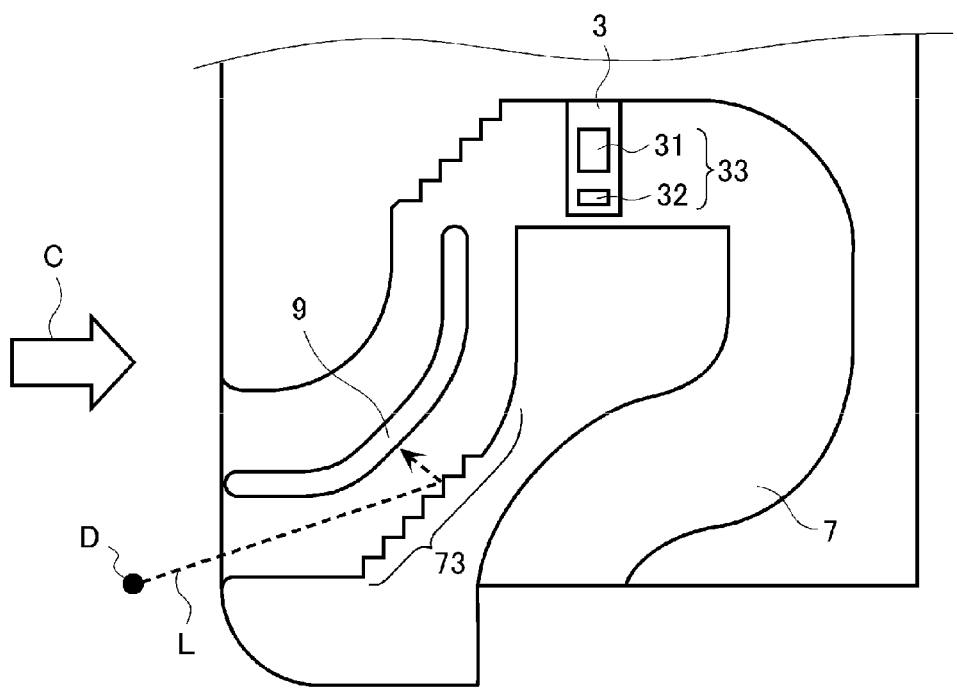
FIG. 10 illustrates an effect of the first step-shaped part and the plate-like member of the flow rate measuring apparatus in accordance with the first embodiment of the invention.

Next, an effect of providing both the first step-shaped part 731 and the plate-like member 9 is described with reference to FIG. 10. As shown in FIG. 10, even when dust enters the bypass passage 7 at an angle and does not perpendicularly collide with the face of the first step-shaped part 731, the dust flies toward the second passage part 74 while colliding with the plate-like member 9 and the first step-shaped part 731. So, the first step-shaped part 731 can reliably cause dust to collide with the plate-like member 9 to substantially decelerate the dust.

Thus, providing both the first step-shaped part 731 and the plate-like member 9 sufficiently decelerates dust. Dust with a particle diameter of 100 μm or less is sufficiently decelerated near the second bending part 75, which is the endpoint of the plate-like member 9, so, even when flying toward the flow rate detecting device 3, does not damage the flow rate detecting part 33 due to small collision energy.

However, relatively large dust with a particle diameter of 200 μm or so, even when decelerated, may damage the flow rate detecting part 33 when colliding with the flow rate detecting part 33. Also, when dust even with a particle diameter of 100 μm or less flies at an acute angle in the bypass passage 7 almost without collision with the plate-like member 9 and the wall surface of the bypass passage 7 and collides with the flow rate detecting part 33, the flow rate detecting part 33 may be damaged.

For this reason, in addition to the plate-like member 9 and the first step-shaped part 731, the flow rate measuring apparatus in accordance with the first embodiment includes the second step-shaped part 751 having a plurality of step shapes each consisting of two faces including the face 752 generally perpendicular to the anti-insertion direction B, placed on the inner wall surface on the outer circumference side of the second bending part 75.

Figure 11:
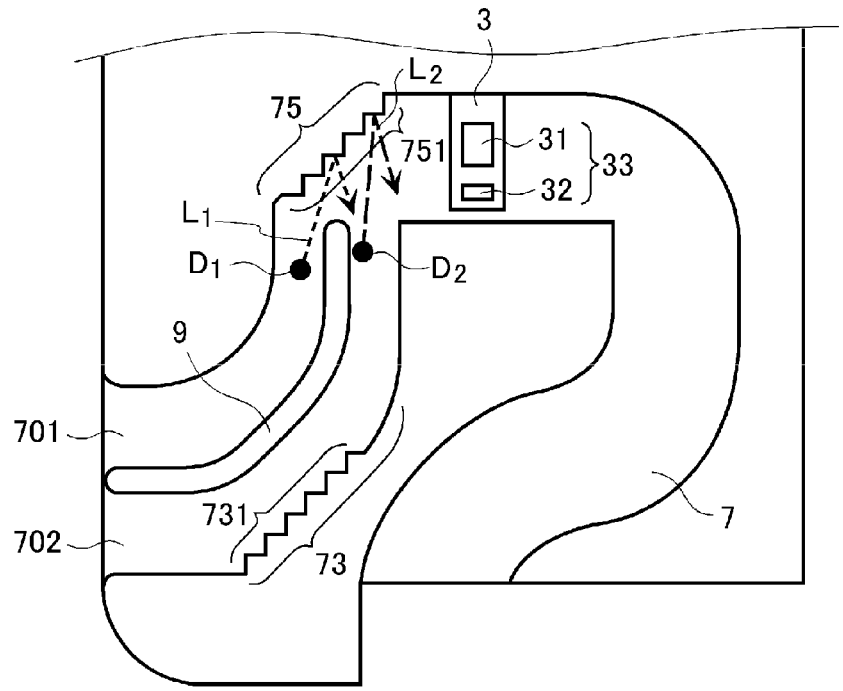
FIG. 11 illustrates an effect of the second step-shaped part and the plate-like member of the flow rate measuring apparatus in accordance with the first embodiment of the invention.

Next, an effect of providing both the plate-like member and the second step-shaped part 751 is described with reference to FIG. 11. As shown in FIG. 11, dusts ($D_1$, $D_2$) are guided by the plate-like member 9 to move toward the second step-shaped part 751 provided on the second bending part 75. The dusts having collided generally perpendicularly with the face 752 of the second step-shaped part 751 fly to the direction away from the flow rate detecting device 3, which can reliably avoid collision with the flow rate detecting part 33.

Figure 12:
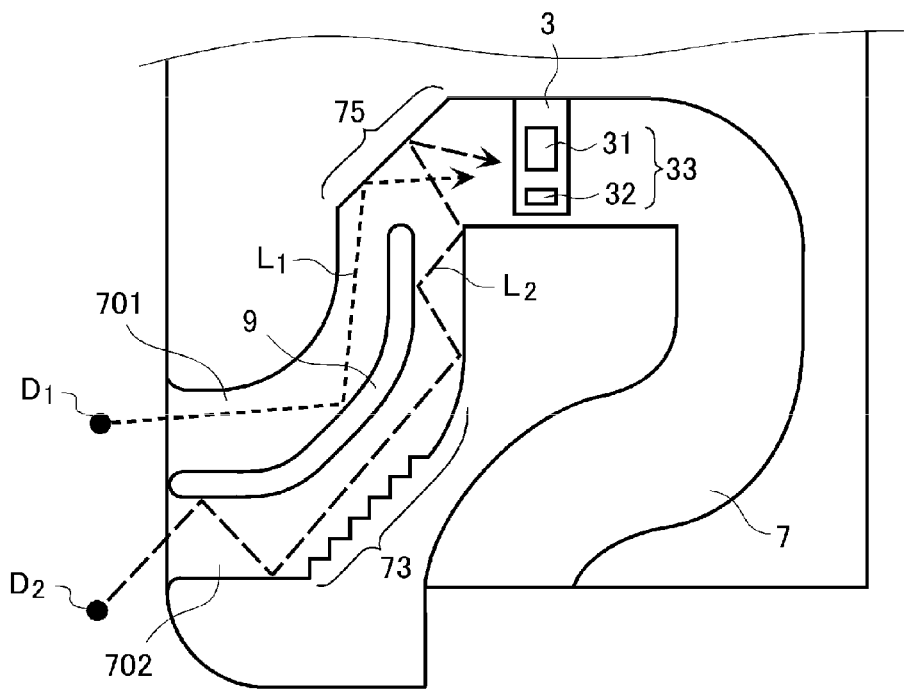
FIG. 12 illustrates a problem of not providing the plate-like member and the second step-shaped part at the same time in the flow rate measuring apparatus in accordance with the first embodiment of the invention.

Next, a problem of not providing the plate-like member 9 and the second step-shaped part 751 at the same time is described with reference to FIG. 12. As shown in FIG. 12, when only the first step-shaped part 731 and the plate-like member are placed and the inner wall surface on the outer circumference side of the second bending part 75 is configured to be flat, dust ($D_1$) passing through the anti-insertion direction-side sub-bypass passage 701 may move toward the flow rate detecting device 3 after colliding with the inner wall surface on the outer circumference side of the second bending part 75 (trajectory $L_1$).

Also, dust ($D_2$) passing through the insertion direction-side sub-bypass passage 702 may move toward the flow rate detecting device 3 after moving forward in the bypass passage 7 without colliding with the first step-shaped part 731 and colliding with the inner wall surface on the outer circumference side of the second bending part 75 (trajectory $L_2$).

Figure 13:
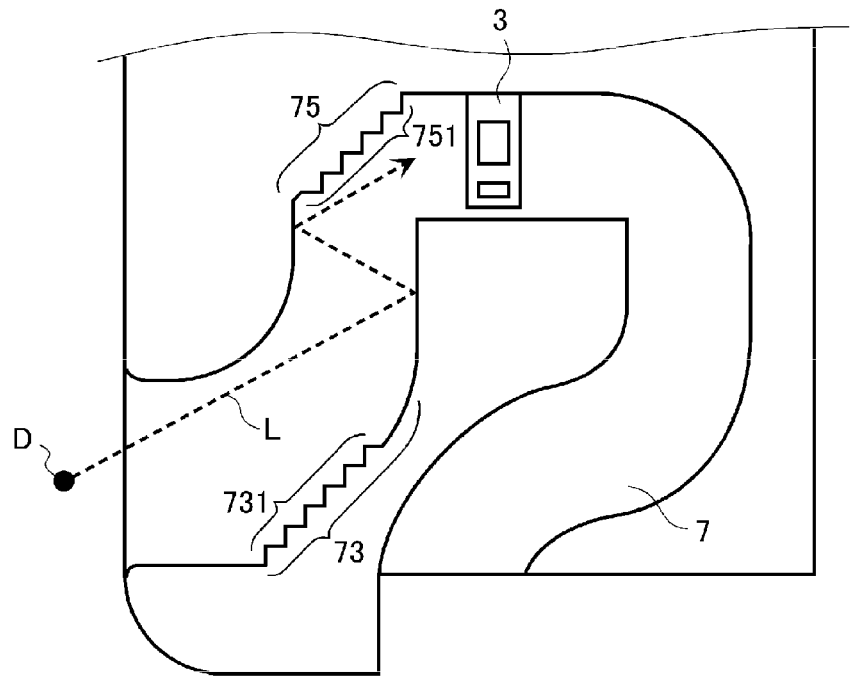
FIG. 13 illustrates a problem of not providing the plate-like member in the flow rate measuring apparatus in accordance with the first embodiment of the invention.

Next, a problem of providing the first step-shaped part 731 and the second step-shaped part 751 and not providing the plate-like member 9 is described with reference to FIG. 13. When the plate-like member 9 is not placed, dust that does not collide with the first step-shaped part 731 nor the second step-shaped part 751 may exist. Such dust, having not collided with the wall surface so often, is not sufficiently decelerated and reaches the flow rate detecting device 3 while still having high collision energy.

In view of the above, in order to address any particle diameter and any flying state of dust, it is important to provide all of the first step-shaped part 731, the second step-shaped part 751 and the plate-like member 9. Also, it is important that each step shape of the first step-shaped part 731 and the second step-shaped part 751 has an angle of generally 90 degrees.

If each step shape is configured to have an angle less than 90 degrees, stagnation is likely to occur in air flow, which may cause a problem that small dust with a particle diameter of 100 μm or less accumulates in the concave portion of the step shape. Furthermore, for a molded part, a shape having an acute angle is likely to cause short shot, so is difficult to be stably obtained as desired. Also, for a molding die, a shape having an acute angle is likely to cause temporal shape variation due to wearing of die or the like.

On the other hand, if each step shape is configured to have an angle larger than 90 degrees, it is difficult to form a face generally perpendicular to the mainstream direction C and the desired effect cannot be obtained. For these reasons, the first step-shaped part 731 and the second step-shaped part 751 desirably have step shapes each consisting of two faces that are placed at an angle of generally 90 degrees to each other.

As described above, according to the first embodiment, dust with various particle diameters entering the bypass passage 7, particularly, relatively large dust with a particle diameter of 100 to 200 μm or so, is reliably caused to collide with the first step-shaped part 731, the second step-shaped part 751 and the plate-like member 9 to be sufficiently decelerated and reach the flow rate detecting device 3 with low collision energy. This can prevent the flow rate detecting device 3 from being damaged and destroyed by high-speed collision of dust.

Furthermore, the placement position of the plate-like member 9 is optimized to suppress air turbulence at the flow rate detecting part 33, which allows a good balance between flow rate detection accuracy and dust tolerance, providing a robust and reliable flow rate measuring apparatus. Furthermore, the first step-shaped part 731, the second step-shaped part 751 and the plate-like member 9 are integrally-molded with the same resin material as that of the bypass passage 7, so the placement positions hardly vary and no additional work for positioning, mounting or the like is needed.

Second Embodiment

Figure 14:
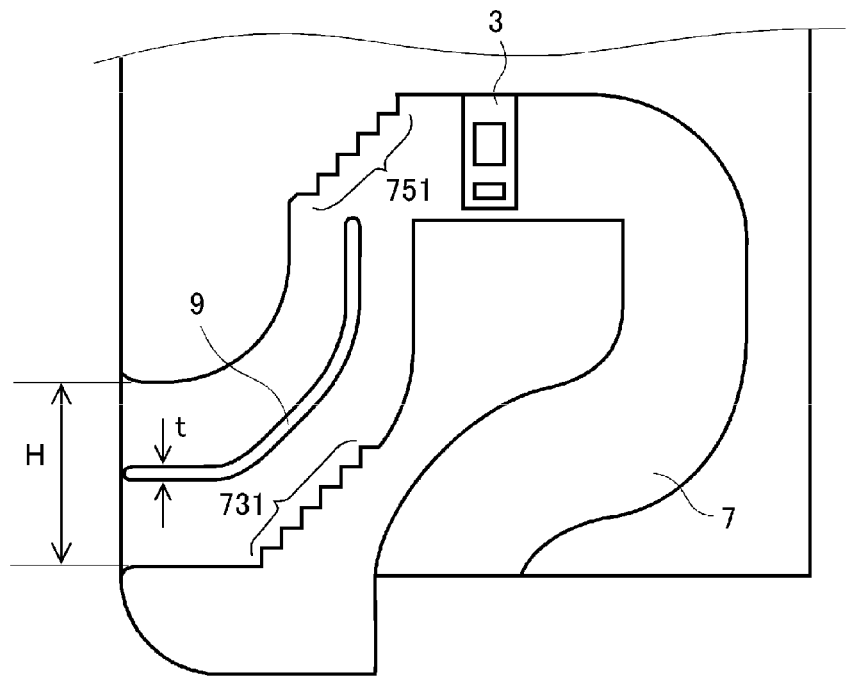
FIG. 14 is a front view of a flow rate measuring apparatus in accordance with a second embodiment of the invention in which a bypass passage and its surroundings are enlarged.

FIG. 14 is a front view of a flow rate measuring apparatus in accordance with a second embodiment of the invention in which a bypass passage and its surroundings are enlarged. In the second embodiment, the plate-like member 9 is formed to have a plate thickness t, the ratio of which to the bypass passage height H is generally less than or equal to 0.2 (i.e., $t/H \leq 0.2$). Note that the rest of the configuration is the same as that of the first embodiment, and will not be repeatedly described.

Figure 15:
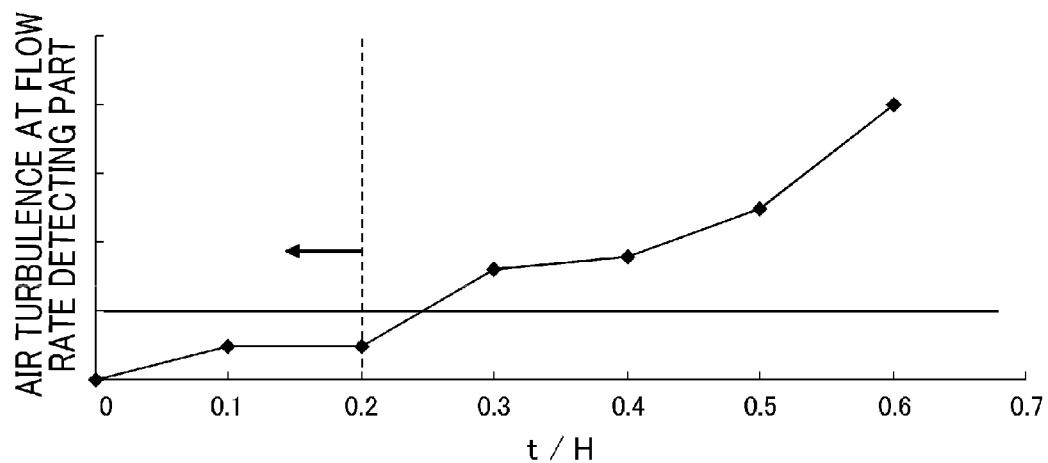
FIG. 15 illustrates the relation between the ratio of the plate thickness of the plate-like member to the bypass passage height and the air turbulence at the flow rate detecting part.

FIG. 15 shows the relation between the ratio of the plate thickness t of the plate-like member 9 to the bypass passage height H (t/H) and the air turbulence at the flow rate detecting part 33. Note that the definition of the air turbulence at the flow rate detecting part 33 is as described in the first embodiment with reference to FIG. 8A, and will not be repeatedly described.

As seen from FIG. 15, placing the plate-like member 9 initially causes the air turbulence at the flow rate detecting part 33 to increase. Furthermore, it is seen that the pressure loss in the bypass passage 7 increases as the plate thickness t increases, and the air turbulence tends to increase when $t/H \geq 0.3$.

For this reason, in the second embodiment, the ratio of the plate thickness t of the plate-like member 9 to the bypass passage height H is set to be generally less than or equal to 0.2, which can suppress turbulence and deceleration of air moving toward the flow rate detecting device 3 while maintaining the dust tolerance almost equal to that of the first embodiment in consideration of pressure loss in the bypass passage 7.

Third Embodiment

Figure 16:
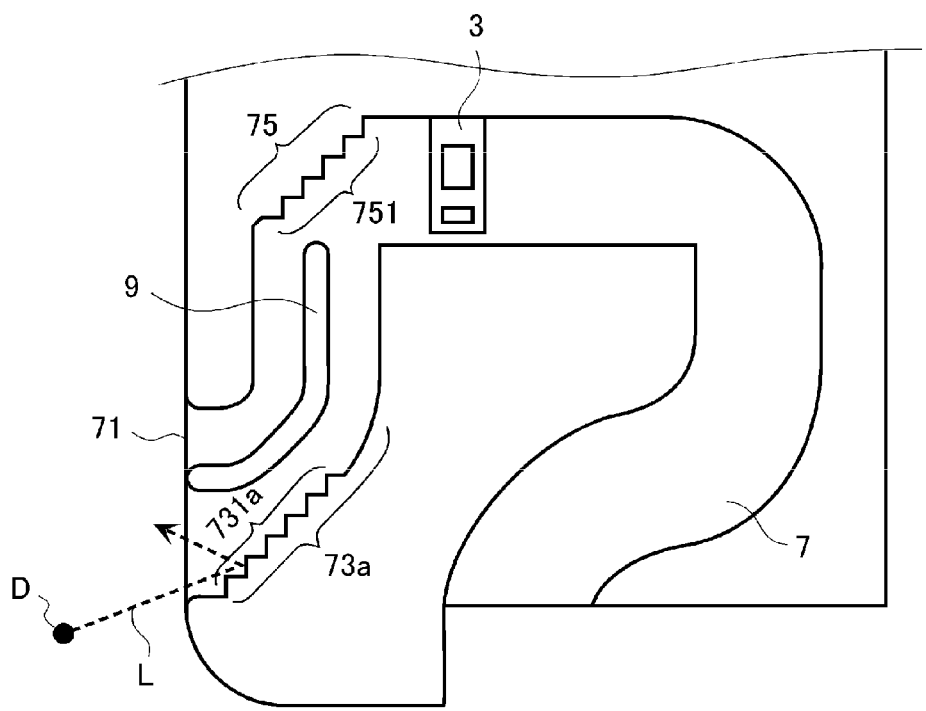
FIG. 16 is a front view of a flow rate measuring apparatus in accordance with a third embodiment of the invention in which a bypass passage and its surroundings are enlarged.

FIG. 16 is a front view of a flow rate measuring apparatus in accordance with a third embodiment of the invention in which a bypass passage and its surroundings are enlarged. In the third embodiment, in the bypass passage 7, the first passage part 72 is omitted and a first bending part 73a is placed near the inlet 71. Note that the rest of the configuration is the same as that of the first embodiment, and will not be repeatedly described.

In the third embodiment, in comparison with the first embodiment, the position of a first step-shaped part 731a provided on the first bending part 73a is closer to the inlet 71. So, as shown in FIG. 16, when dust entering the bypass passage 7 collides with the first step-shaped part 731a and rebounds, the dust is likely to be ejected to the outside of the bypass passage 7 independent of location and angle of rebounding. Accordingly, the total amount of dust entering the bypass passage 7 can be significantly reduced.

Thus, according to the third embodiment, in addition to the same effect as that of the first embodiment, the total amount of dust reaching the flow rate detecting device 3 placed in the bypass passage 7 can be reduced, which can reliably prevent the flow rate detecting part 33 from being damaged by dust.

Fourth Embodiment

Figure 17A:
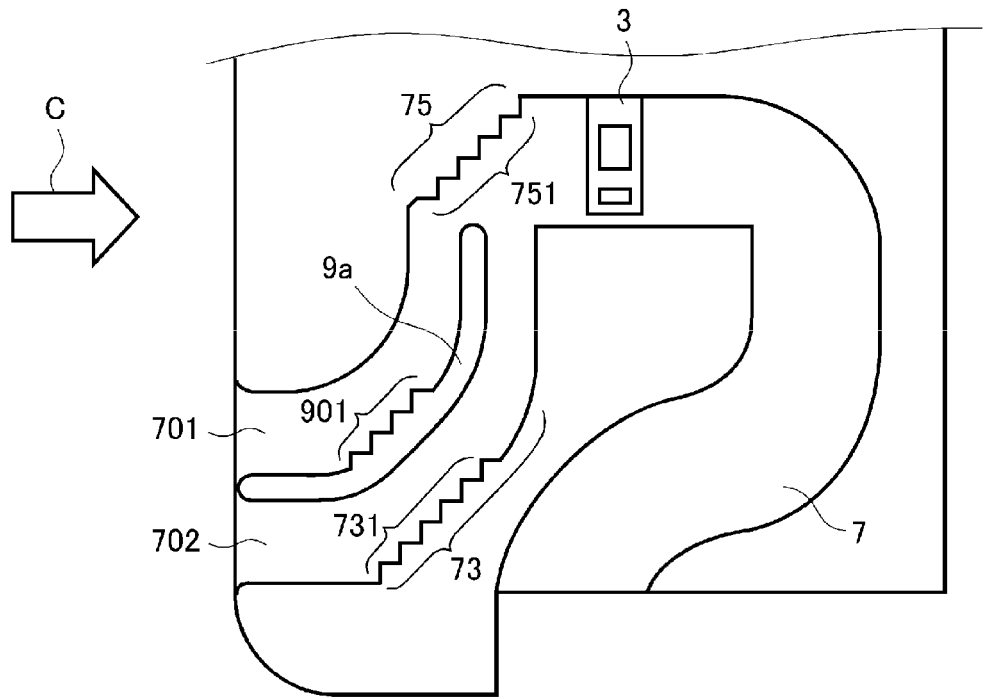
FIG. 17A is a front view of a flow rate measuring apparatus in accordance with a fourth embodiment of the invention in which a bypass passage and its surroundings are enlarged.
Figure 17B:
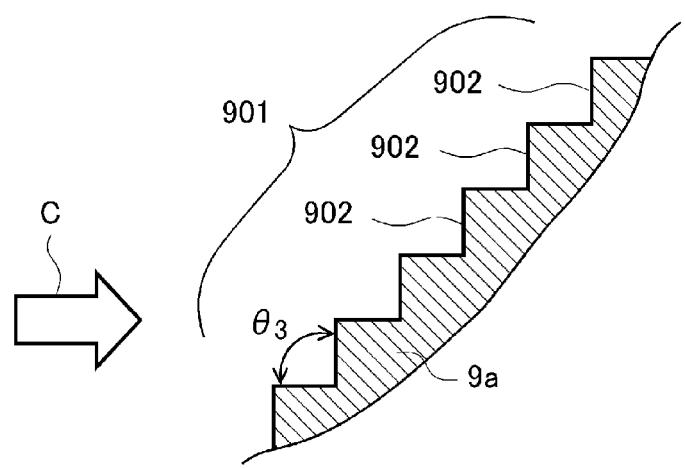
FIG. 17B illustrates a third step-shaped part of the flow rate measuring apparatus.

FIG. 17A is a front view of a flow rate measuring apparatus in accordance with a fourth embodiment of the invention in which a bypass passage and its surroundings are enlarged. FIG. 17B illustrates a third step-shaped part 901 provided on a plate-like member 9a of the flow rate measuring apparatus in accordance with the fourth embodiment.

In the fourth embodiment, the third step-shaped part 901 having a plurality of step shapes each consisting of two faces including a face 902 generally perpendicular to the mainstream direction C is placed on the anti-insertion direction B-side surface of the plate-like member 9a. Note that the rest of the configuration is the same as that of the first embodiment, and will not be repeatedly described.

As shown in FIG. 17B, in the third step-shaped part 901, the two faces forming each step shape are placed at an angle $\theta_3$ of generally 90 degrees to each other. The reason for configuring each step shape of the third step-shaped part 901 to have an angle of generally 90 degrees is the same as that for the first step-shaped part 731 and the second step-shaped part 751, and will not be repeatedly described.

In the fourth embodiment, dust entering the insertion direction-side sub-bypass passage 702 through the inlet 71 of the bypass passage 7 collides with the first step-shaped part 731 provided on the first bending part 73, which provides the same effect as that of the first embodiment.

On the other hand, dust entering the anti-insertion direction-side sub-bypass passage 701 generally perpendicularly collides with the face 902 of the third step-shaped part 901 provided on the plate-like member 9a and then is ejected to the intake pipe 1 through the inlet 71. Also, dust colliding with the face 902 of the third step-shaped part 901 at an angle flies toward the wall surface of the bypass passage 7 with collision energy reduced.

Thus, according to the fourth embodiment, in addition to the same effect as that of the first embodiment, an effect of ejecting dust entering the anti-insertion direction-side sub-bypass passage 701 to the intake pipe 1 and an effect of further reducing collision energy of the dust are obtained. Note that the configuration of the second and third embodiments may also be applied to the flow rate measuring apparatus including the plate-like member 9a in accordance with the fourth embodiment.

Fifth Embodiment

Figure 18:
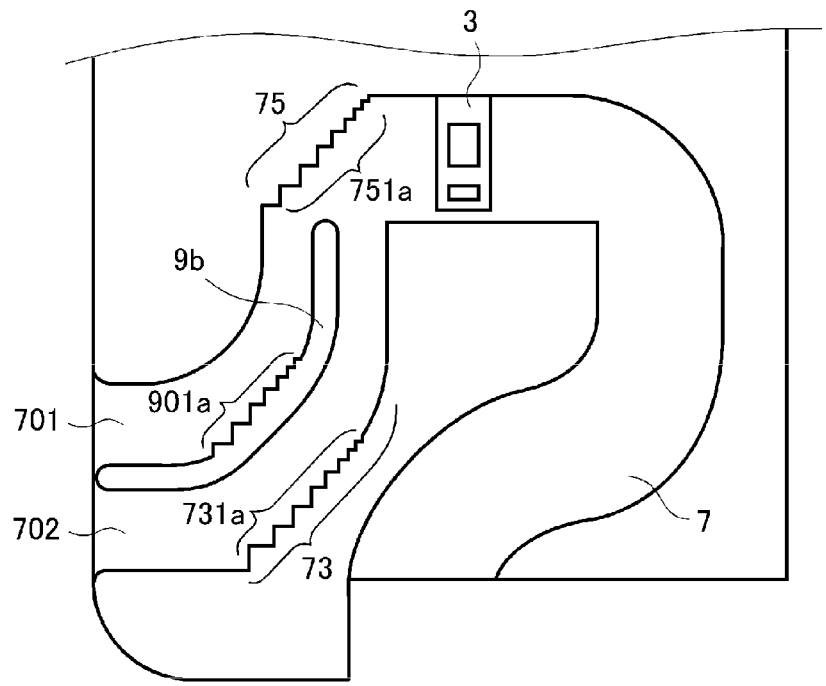
FIG. 18 is a front view of a flow rate measuring apparatus in accordance with a fifth embodiment of the invention in which a bypass passage and its surroundings are enlarged.

FIG. 18 is a front view of a flow rate measuring apparatus in accordance with a fifth embodiment of the invention in which a bypass passage and its surroundings are enlarged. In the fifth embodiment, a third step-shaped part 901a is provided on a plate-like member 9b as with the fourth embodiment. Furthermore, in all of a first step-shaped part 731a, a second step-shaped part 751a and the third step-shaped part 901a, the area of two faces forming each step shape gradually decreases toward the downstream side of the bypass passage 7. Note that the rest of the configuration is the same as that of the first embodiment, and will not be repeatedly described.

In the fifth embodiment, the closer to the flow rate detecting device 3, the smaller the area (height and depth) of each step shape of the first to third step-shaped parts 731a, 751a, 901a is, which provides an effect of suppressing turbulence of air moving toward the flow rate detecting device 3. Thus, according to the fifth embodiment, in addition to the same effect as that of the first embodiment, air turbulence at the flow rate detecting part 33 can be suppressed, which can suppress decrease in the flow rate detection accuracy of the flow rate detecting device 3.

Note that, in FIG. 18, the area of two faces forming each step shape of the first to third step-shaped parts 731a, 751a, 901a gradually decreases toward the downstream side, however all of the step-shaped parts may not be so. Also, the area of one of the two faces forming each step shape may be smaller. Also, the configuration of the step-shaped parts in the fifth embodiment may be applied to the flow rate measuring apparatus in accordance with the first to third embodiments.

Sixth Embodiment

Figure 19:
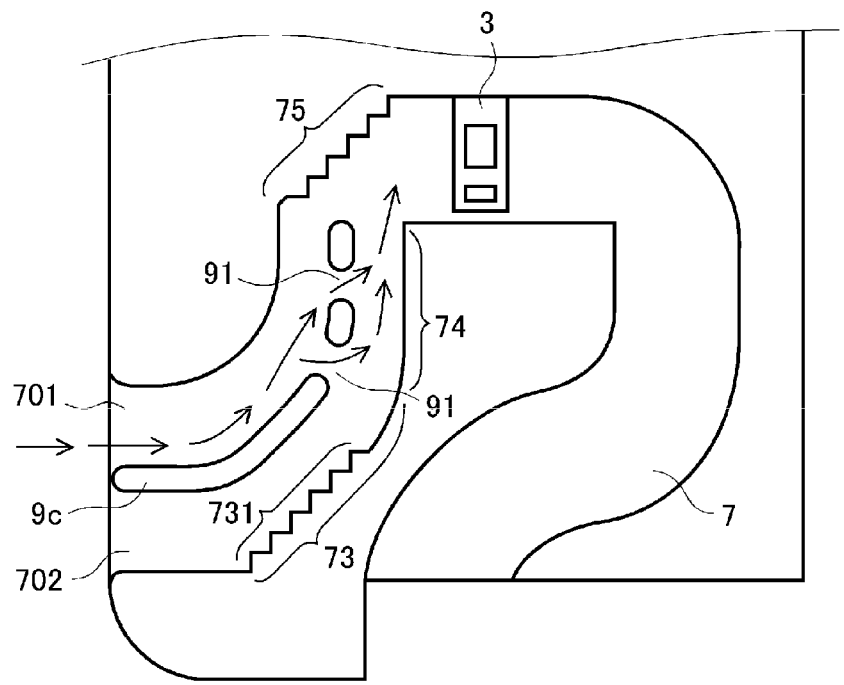
FIG. 19 is a front view of a flow rate measuring apparatus in accordance with a sixth embodiment of the invention in which a bypass passage and its surroundings are enlarged.

FIG. 19 is a front view of a flow rate measuring apparatus in accordance with a sixth embodiment of the invention in which a bypass passage and its surroundings are enlarged. In the sixth embodiment, in the second passage part 74, a plate-like member 9c includes a slit 91 passing therethrough in the plate thickness direction. In FIG. 19, the slit 91 is provided at two locations in the plate-like member 9c, but the number of slits 91 is not limited to this. Note that the rest of the configuration is the same as that of the first embodiment, and will not be repeatedly described.

In FIG. 19, arrows indicate air flow. Air flowing in the bypass passage 7 is bent by right angle at the first bending part 73, and furthermore, the bypass passage height is decreased from the first passage part 72 to the second passage part 74, which locally increases pressure loss near the second passage part 74.

So, in the sixth embodiment, the slit 91 that is an additional path for air is provided in the second passage part 74 downstream of the first bending part 73. This causes air passing through the anti-insertion direction-side sub-bypass passage 701 to flow into the insertion direction-side sub-bypass passage 702, which suppresses local increase in pressure loss near the second passage part 74.

According to the sixth embodiment, in addition to the same effect as that of the first embodiment, turbulence and deceleration of air moving toward the flow rate detecting device 3 can be suppressed. Note that the slit 91 of the plate-like member 9c in the sixth embodiment may be applied to the flow rate measuring apparatus in accordance with the second to fifth embodiments.

Seventh Embodiment

In the flow rate measuring apparatus in accordance with the first to sixth embodiments, as a structure for preventing dust entering the bypass passage 7 from colliding with the flow rate detecting part 33 at high speed to damage the flow rate detecting part 33, the plate-like member 9 (9a, 9b, 9c), the first step-shaped part 731 (731a), the second step-shaped part 751 (751a) and the third step-shaped part 901 (901a) are placed in the bypass passage 7.

Furthermore, the placement position and shape of them are optimized to improve the dust tolerance of the flow rate detecting device 3 and suppress turbulence and deceleration of air moving toward the flow rate detecting device 3 to minimum.

However, in some cases, the impact of pressure loss due to the placement of the plate-like member 9 in the bypass passage 7 may not be negligible. Specifically, with air taken into the bypass passage 7 initially at low speed, when the air reaches the flow rate detecting device 3, the air may be further decelerated to be difficult to detect. Thus, it is undeniable that pressure loss due to the placement of the plate-like member 9 may narrow the detectable flow rate range for the flow rate detecting device 3 to reduce the flow rate detection accuracy.

So, in the seventh embodiment, as a structure for accelerating air moving toward the flow rate detecting device 3, a flow rate measuring apparatus having a flow contraction part 703 and a flow expansion part 704 in the bypass passage 7 is proposed. Note that the seventh embodiment maybe applied to the flow rate measuring apparatus in accordance with the first to sixth embodiments.

The flow contraction part 703 is a part upstream of the flow rate detecting device 3 in the bypass passage 7 in which the bypass passage width W is continuously reduced to gradually reduce the passage cross-sectional area. On the other hand, the flow expansion part 704 is a part downstream of the flow rate detecting device 3 in the bypass passage 7 in which the bypass passage width W is continuously increased to gradually increase the passage cross-sectional area.

Note that the bypass passage 7 is desirably formed such that the bypass passage height of at least part of the downstream side of the flow expansion part 704 is larger than the bypass passage height of the upstream side of the flow contraction part 703. This can reduce pressure loss downstream of the flow rate detecting device 3 to further accelerate air moving toward the flow rate detecting device 3.

Also, the placement position of the flow contraction part 703 and the flow expansion part 704 is not specifically limited except that they are positioned upstream or downstream of the flow rate detecting device 3. However, the closer to the flow rate detecting device 3, the greater the effect is.

Figure 20A:
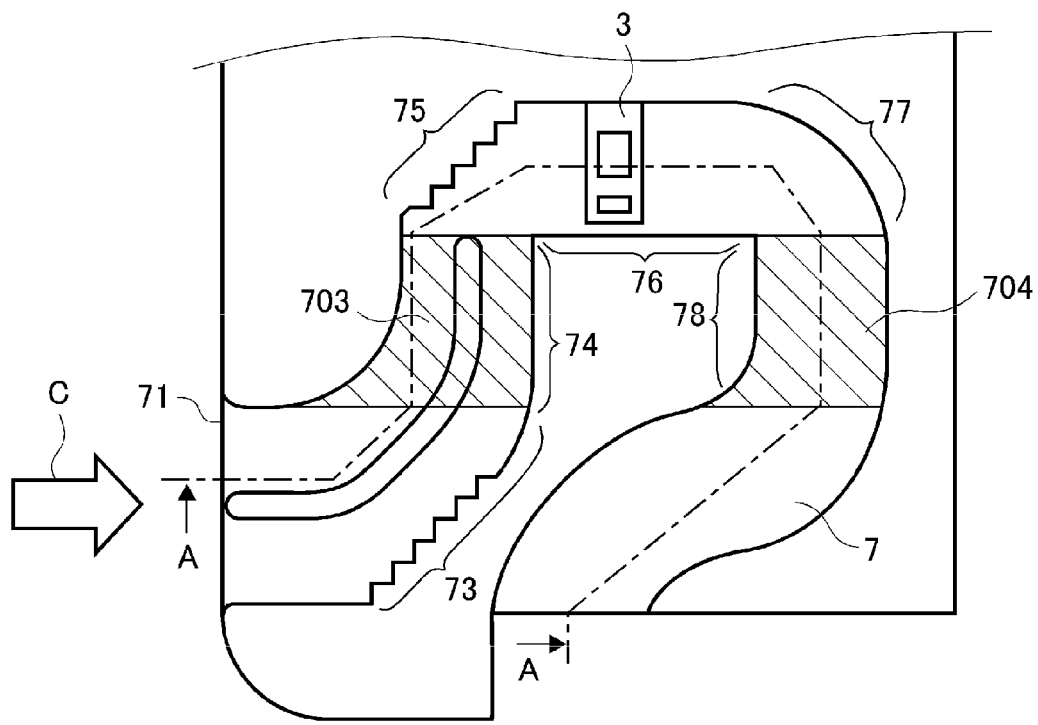
FIG. 20A is a front view of a flow rate measuring apparatus in accordance with a seventh embodiment of the invention in which a bypass passage and its surroundings are enlarged.
Figure 20B:
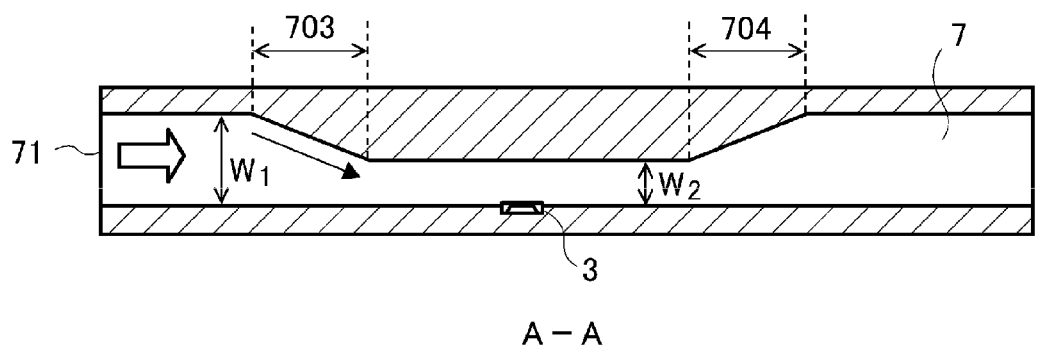
FIG. 20B is a cross sectional view of the bypass passage taken along the line A-A in FIG. 20A.
Figure 21A:
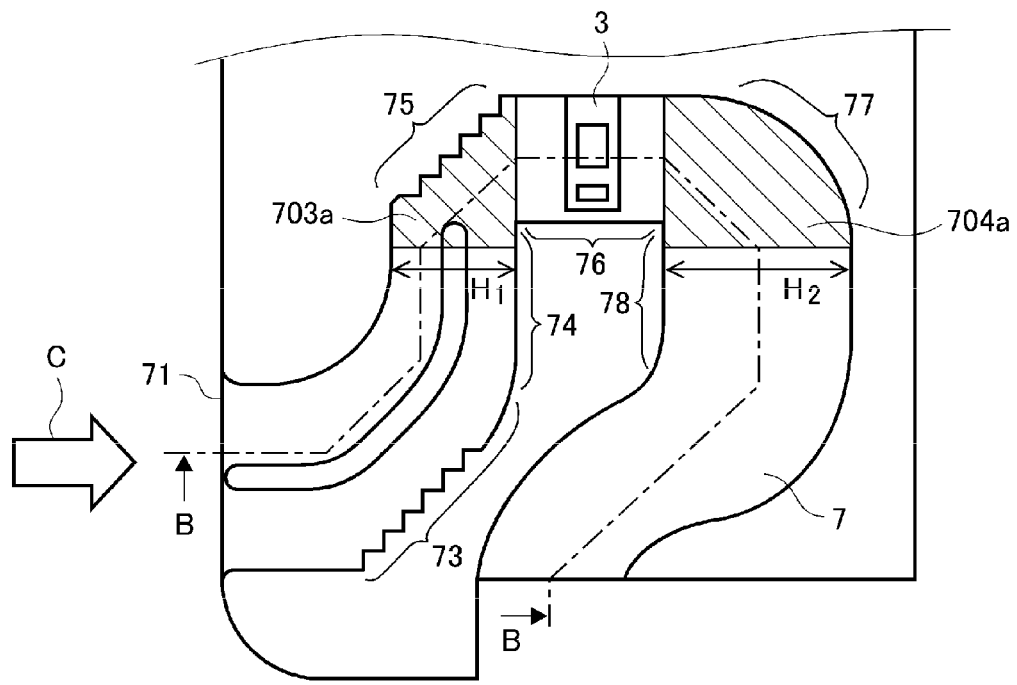
FIG. 21A is a front view of a flow rate measuring apparatus in accordance with the seventh embodiment of the invention in which a bypass passage and its surroundings are enlarged.
Figure 21B:
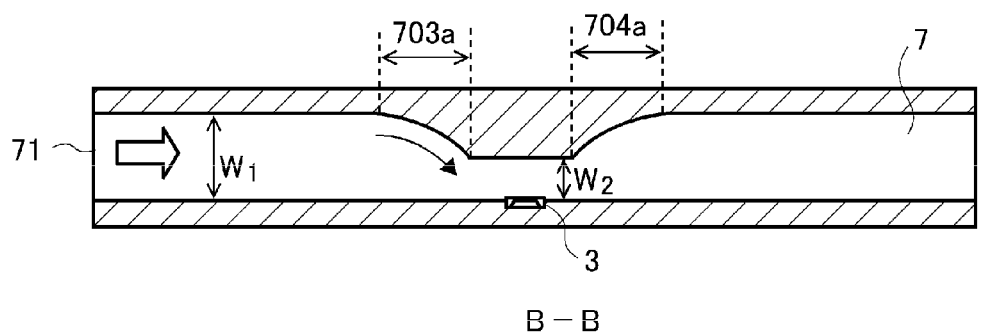
FIG. 21B is a cross sectional view of the bypass passage taken along the line B-B in FIG. 21A.
Figure 22A:
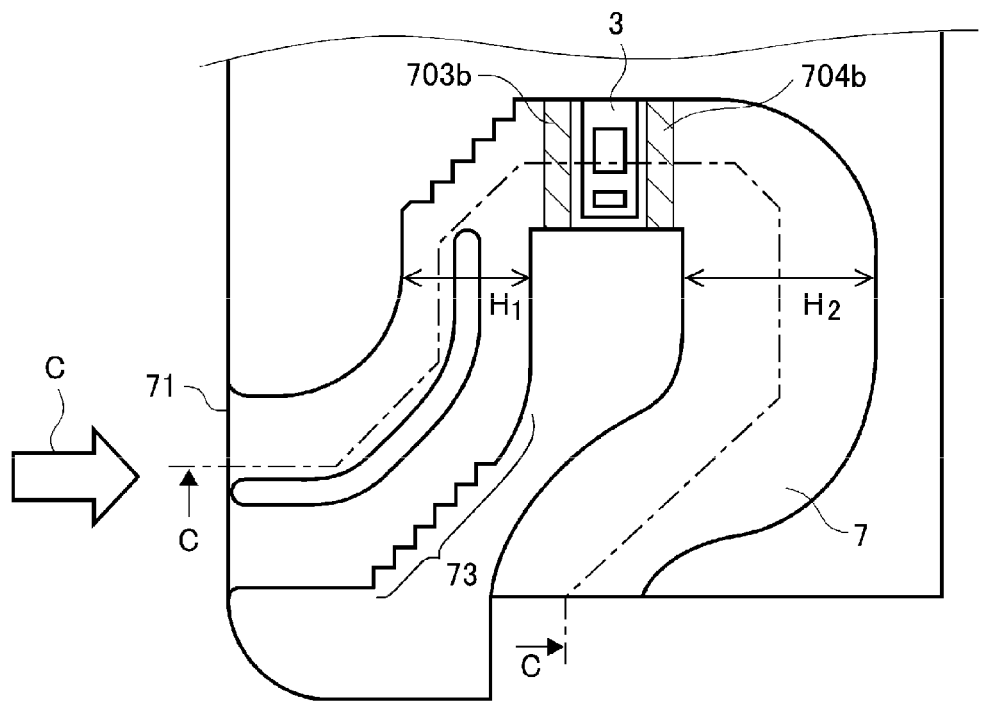
FIG. 22A is a front view of a flow rate measuring apparatus in accordance with the seventh embodiment of the invention in which a bypass passage and its surroundings are enlarged.
Figure 22B:
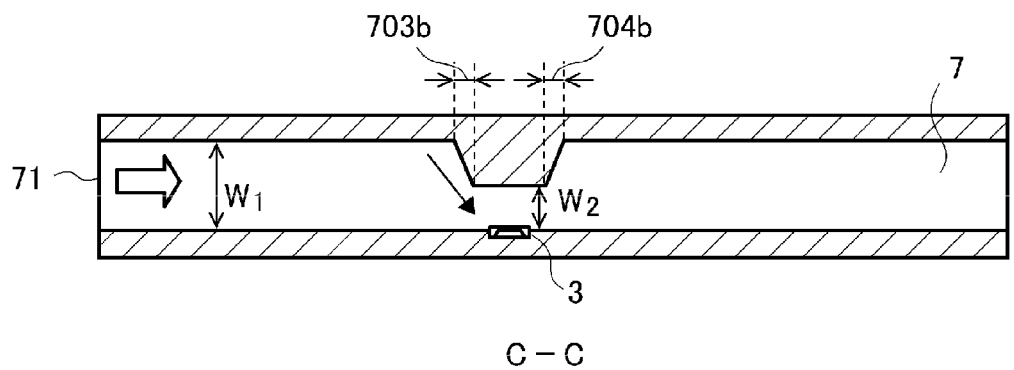
FIG. 22B is a cross sectional view of the bypass passage taken along the line C-C in FIG. 22A.

FIGS. 20 to 22 show an example of placement position of the flow contraction part 703 and the flow expansion part 704. FIGS. 20A, 21A and 22A are a front view of the flow rate measuring apparatus in accordance with the seventh embodiment in which the bypass passage and its surroundings are enlarged. FIGS. 20B, 21B and 22B are a cross-sectional view of the bypass passage taken along the line A-A (B-B, C-C) in FIG. 20A (21A, 22A). Note that, in FIGS. 20A, 21A and 22A, the shaded area indicates the range of the flow contraction part and the flow expansion part.

In the example shown in FIG. 20, the bypass passage 7 includes a fourth passage part 78 that extends from the third bending part 77 to the insertion direction A along the direction perpendicular to the mainstream direction C. The flow contraction part 703 is provided in the second passage part 74. The flow expansion part 704 is provided in the fourth passage part 78. As shown in FIG. 20B, the third passage part 76 in which the flow rate detecting device 3 is placed has a bypass passage width $W_2$ smaller than a bypass passage width $W_1$ upstream the flow contraction part 703.

In the example shown in FIG. 21, a flow contraction part 703a is provided in the second bending part 75, and a flow expansion part 704a is provided in the third bending part 77. Also, as shown in FIG. 21A, the fourth passage part 78 has a bypass passage height $H_2$ larger than a bypass passage height $H_1$ of the second passage part 74.

In this example, the flow contraction part 703a is provided closer to the flow rate detecting device 3 than that of the example shown in FIG. 20, which causes flow-contracted flow velocity vector in the bypass passage 7 to be flow velocity distribution toward the flow rate detecting device 3. This can accelerate air hitting the flow rate detecting part 33.

On the other hand, in the example in FIG. 22, a flow contraction part 703b is provided upstream of the flow rate detecting device 3 in the third passage part 76, and a flow expansion part 704b is provided downstream of the flow rate detecting device 3 in the third passage part 76. Also, as shown in FIG. 22A, the bypass passage height $H_2$ of the fourth passage part 78 is larger than the bypass passage height $H_1$ of the second passage part 74.

In this example, the flow contraction part 703b is provided further closer to the flow rate detecting device 3 than that of the example shown in FIG. 21, which directly causes flow-contracted flow velocity vector in the bypass passage 7 to be flow velocity distribution toward the flow rate detecting device 3. This can further accelerate air hitting the flow rate detecting part 33.

According to the seventh embodiment, in addition to maintaining the dust tolerance achieved by the flow rate measuring apparatus in accordance with the first to sixth embodiments, the detectable flow rate range for the flow rate detecting device 3 can be prevented from being narrowed by the impact of pressure loss due to the plate-like member 9. Note that the embodiments of the invention may be freely combined or appropriately modified or omitted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A flow rate measuring apparatus that is inserted into a through hole formed in a pipe from the outside of the pipe and is placed in the pipe such that the insertion direction into the through hole is generally perpendicular to the mainstream direction of fluid to be measured passing through the pipe, the apparatus comprising: a bypass passage, having a rectangular passage cross section, for causing part of fluid to be measured to pass therethrough; and a flat plate-shaped flow rate detecting device provided in the bypass passage, wherein the bypass passage includes: an inlet that is open in the direction toward the upstream side of the mainstream direction and takes in part of fluid to be measured; a first passage part that extends from the inlet to a first bending part along the mainstream direction; a second passage part that extends from the first bending part toward the anti-insertion direction to a second bending part along the direction perpendicular to the mainstream direction; and a third passage part that extends from the second bending part to a third bending part along the mainstream direction, the flow rate detecting device being placed such that one wall surface of the third passage part is flush with one principal surface of the flow rate detecting device, a first step-shaped part having a plurality of step shapes each consisting of two faces including a face generally perpendicular to the mainstream direction is placed on the inner wall surface on the outer circumference side of the first bending part; and a second step-shaped part having a plurality of step shapes each consisting of two faces including a face generally perpendicular to the anti-insertion direction is placed on the inner wall surface on the outer circumference side of the second bending part, and a plate-like member that divides the passage cross section of the bypass passage into the insertion direction side and the anti-insertion direction side is placed from the inlet to the downstream-side end of the second passage part along the shape of the bypass passage.

2. The flow rate measuring apparatus according to claim 1, wherein the plate-like member is formed of the same resin material as the inner wall surface of the bypass passage and is integrally-molded with the bypass passage.

3. The flow rate measuring apparatus according to claim 1, wherein, in the rectangular passage cross section of the bypass passage, with the distance between two sides parallel to the thickness direction of the flow rate detecting device referred to as bypass passage height, the plate-like member has a plate thickness, the ratio of which to the bypass passage height is less than or equal to 0.2.

4. The flow rate measuring apparatus according to claim 1, wherein, in the bypass passage, the first passage part is omitted and the first bending part is placed near the inlet.

5. The flow rate measuring apparatus according to claim 1, wherein, in the first step-shaped part, the area of two faces forming each step shape gradually decreases toward the downstream side of the bypass passage.

6. The flow rate measuring apparatus according to claim 1, wherein, in the second step-shaped part, the area of two faces forming each step shape gradually decreases toward the downstream side of the bypass passage.

7. The flow rate measuring apparatus according to claim 1, wherein, in the second passage part, the plate-like member includes a slit passing therethrough in the plate thickness direction.

8. The flow rate measuring apparatus according to claim 1, wherein, in the first step-shaped part and the second step-shaped part, the two faces forming each step shape are placed at an angle of generally 90 degrees to each other.

9. The flow rate measuring apparatus according to claim 8, wherein, in the first step-shaped part, the area of two faces forming each step shape gradually decreases toward the downstream side of the bypass passage.

10. The flow rate measuring apparatus according to claim 8, wherein, in the second step-shaped part, the area of two faces forming each step shape gradually decreases toward the downstream side of the bypass passage.

11. The flow rate measuring apparatus according to claim 1, wherein a third step-shaped part having a plurality of step shapes each consisting of two faces including a face generally perpendicular to the mainstream direction is placed on the anti-insertion direction-side surface of the plate-like member.

12. The flow rate measuring apparatus according to claim 11, wherein, in the third step-shaped part, the area of two faces forming each step shape gradually decreases toward the downstream side of the bypass passage.

13. The flow rate measuring apparatus according to claim 11, wherein, in the second passage part, the plate-like member includes a slit passing therethrough in the plate thickness direction.

14. The flow rate measuring apparatus according to claim 11, wherein, in the third step-shaped part, the two faces forming each step shape are placed at an angle of generally 90 degrees to each other.

15. The flow rate measuring apparatus according to claim 14, wherein, in the third step-shaped part, the area of two faces forming each step shape gradually decreases toward the downstream side of the bypass passage.

16. The flow rate measuring apparatus according to claim 1, wherein, in the rectangular passage cross section of the bypass passage, with the distance between two sides parallel to the thickness direction of the flow rate detecting device referred to as bypass passage height and the distance between two sides perpendicular to the thickness direction of the flow rate detecting device referred to as bypass passage width, the bypass passage includes: a flow contraction part upstream of the flow rate detecting device in which the bypass passage width is continuously reduced to gradually reduce the passage cross-sectional area; and a flow expansion part downstream of the flow rate detecting device in which the bypass passage width is continuously increased to gradually increase the passage cross-sectional area.

17. The flow rate measuring apparatus according to claim 16, wherein, in the bypass passage, the bypass passage height of at least part of the downstream side of the flow expansion part is larger than the bypass passage height of the upstream side of the flow contraction part.

18. The flow rate measuring apparatus according to claim 16, wherein the bypass passage includes a fourth passage part that extends from the third bending part to the insertion direction along the direction perpendicular to the mainstream direction;

the flow contraction part is provided in the second passage part; and the flow expansion part is provided in the fourth passage part.

19. The flow rate measuring apparatus according to claim 16, wherein the flow contraction part is provided in the second bending part; and the flow expansion part is provided in the third bending part.

20. The flow rate measuring apparatus according to claim 16, wherein the flow contraction part is provided upstream of the flow rate detecting device in the third passage part; and the flow expansion part is provided downstream of the flow rate detecting device in the third passage part.

* * * * *